United States Patent [19]

Myhre

[11] Patent Number: 4,507,170

[45] Date of Patent: Mar. 26, 1985

[54] OPTIMIZED STRESS AND STRAIN DISTRIBUTION DIAPHRAGMS

[76] Inventor: Kjell E. Myhre, 941 Enterprise Ave., Inglewood, Calif. 90302

[21] Appl. No.: 419,352

[22] Filed: Sep. 17, 1982

Related U.S. Application Data

[62] Division of Ser. No. 110,024, Jan. 7, 1980, Pat. No. 4,376,929, which is a division of Ser. No. 1,310, Jan. 5, 1979, abandoned, which is a division of Ser. No. 754,251, Dec. 27, 1976, Pat. No. 4,133,100.

[51] Int. Cl.³ .................. B44C 1/22; C03C 15/00; C03C 25/06; C23F 1/02
[52] U.S. Cl. .................. 156/633; 156/654; 156/656; 156/659.1; 156/634
[58] Field of Search .............. 156/629, 633, 634, 654, 156/656, 659.1; 29/610 SG, 610 R; 73/727; 338/4

[56] References Cited

U.S. PATENT DOCUMENTS 3,246,385 4/1966 King .................................. 29/610 X
3,278,881 10/1966 Anderson et al. ................. 29/610 X Primary Examiner—William A. Powell
Attorney, Agent, or Firm—Benoit Law Corporation

[57] ABSTRACT

A stress distribution plate, such as a diaphragm for a pressure transducer, has a central plane and a neutral stress plane. According to the invention, the neutral stress plane is displaced from the central plane, providing for a mechanical advantage or amplification in the operation of the stress plate or transducer. The stress plate or diaphragm may be provided with a lacunose surface region or with a predetermined and preferably symmetrical pattern of mesas and recesses for a displacement of the neutral stress plane relative to the central plane.

63 Claims, 51 Drawing Figures

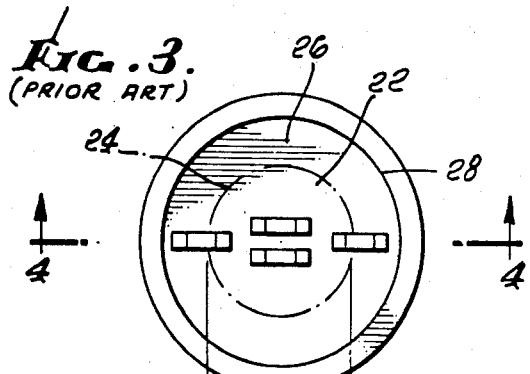
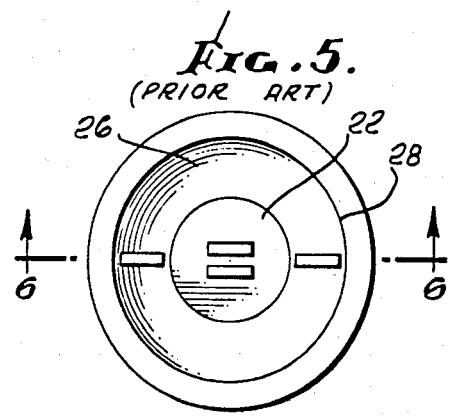
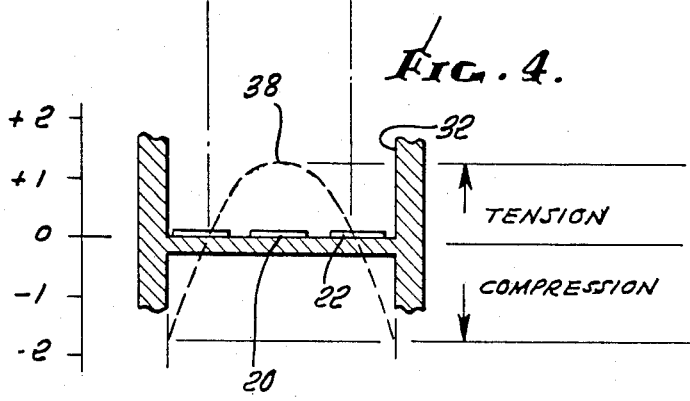
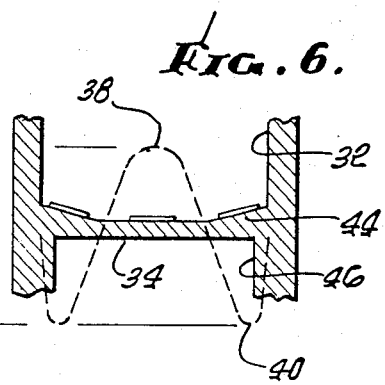
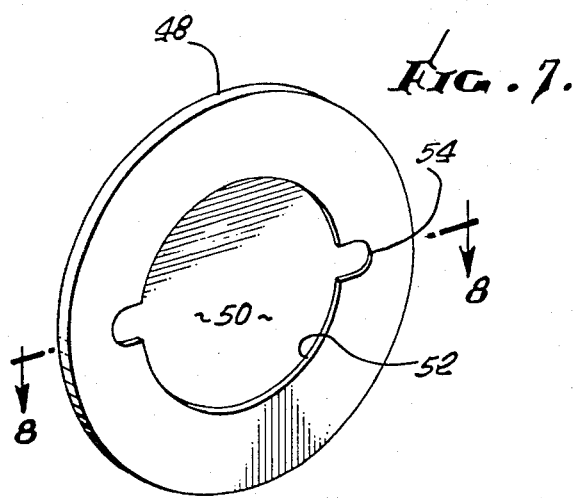
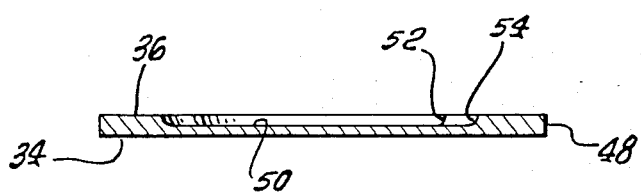

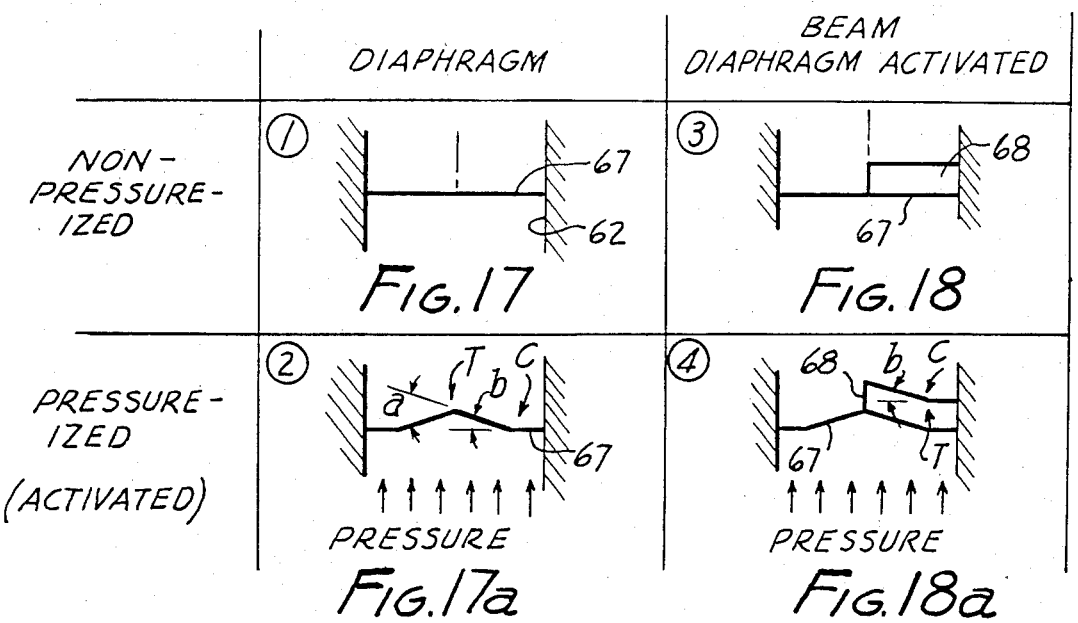
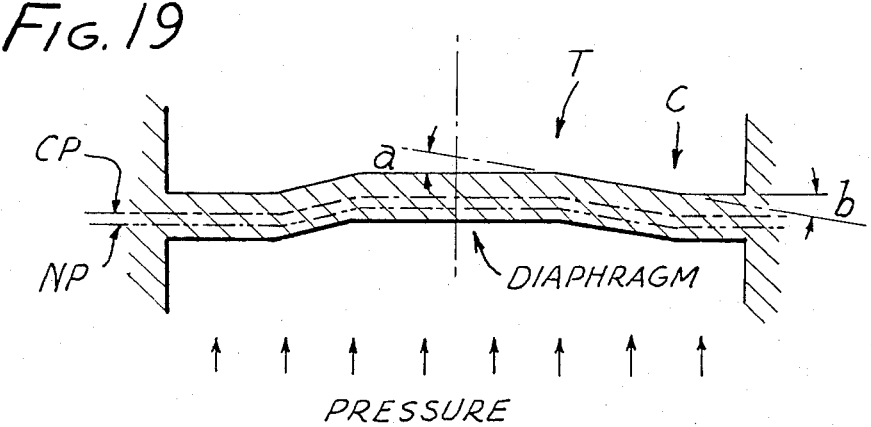
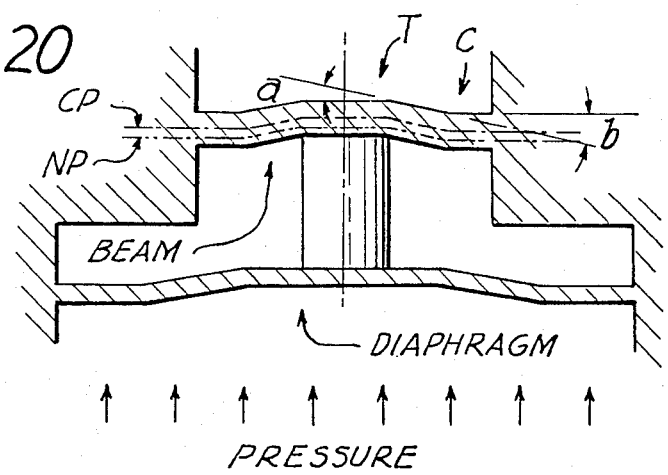

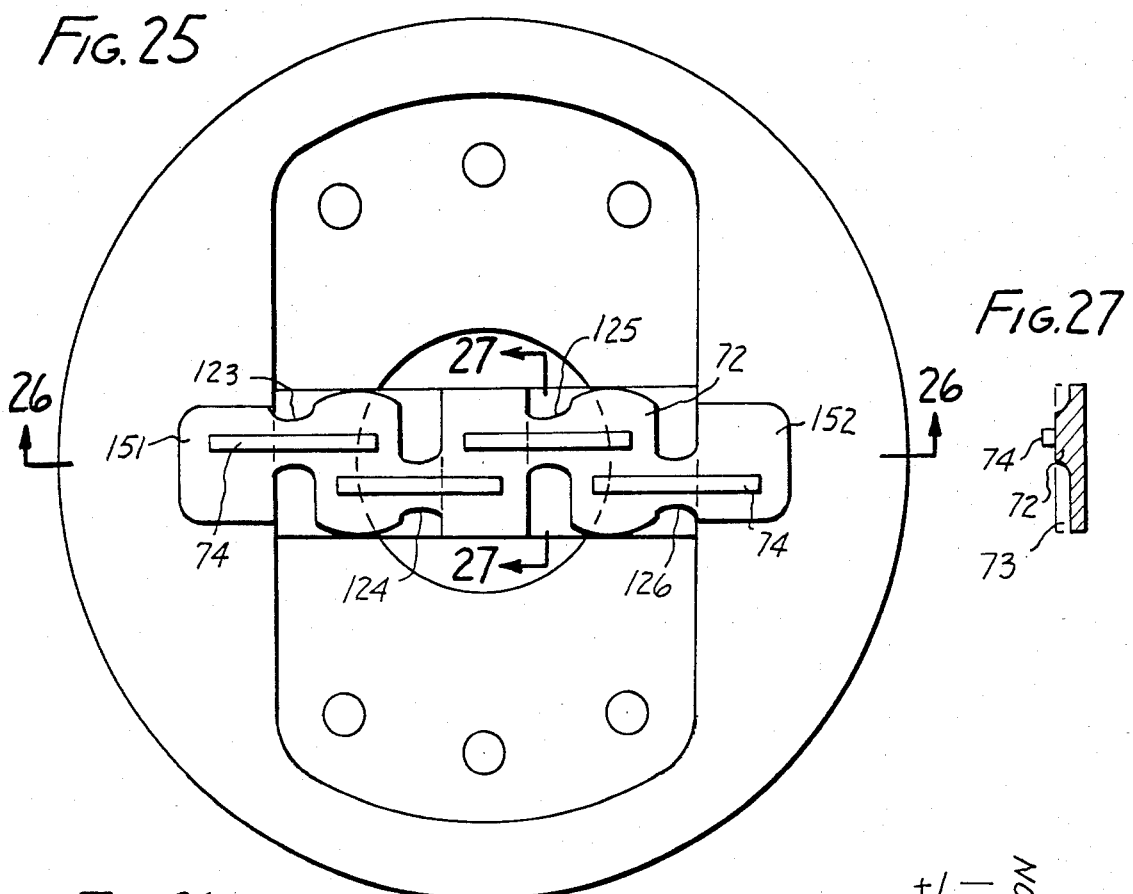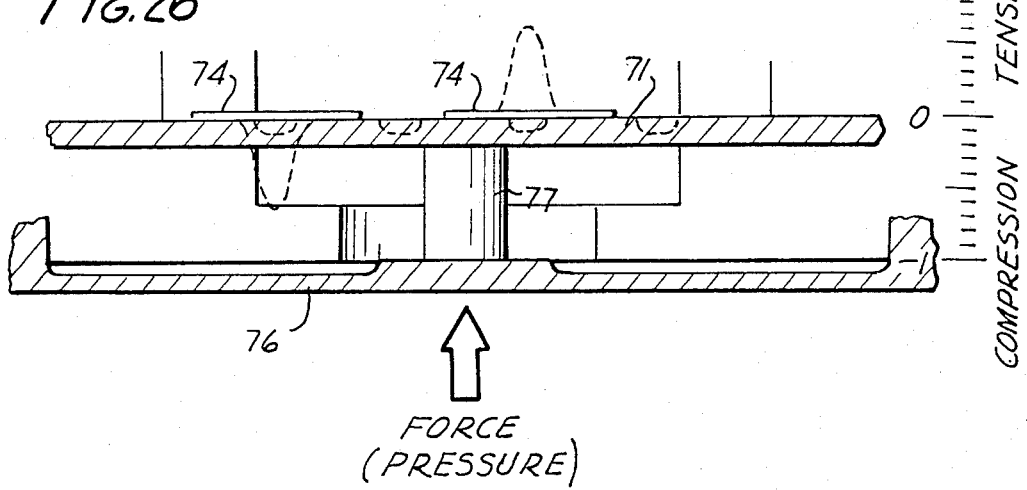

OPTIMIZED STRESS AND STRAIN DISTRIBUTION DIAPHRAGMS

This is a division of Ser. No. 06/110,024, filed Jan. 7, 1980, for Optimized Stress and Strain Distribution Diaphragms (now U.S. Pat. No. 4,376,929, issued Mar. 15, 1983) which is a division of Ser. No. 1,310, filed Jan. 5, 1979 (now abandoned) which was a division of Ser. No. 754,251, filed Dec. 27, 1976 (now U.S. Pat. No. 4,133,100, issued Jan. 9, 1979). Ser No. 6,086, filed Jan. 24, 1979 (now abandoned) is a continuation-in-part of Ser. No. 1,310.

BACKGROUND OF THE INVENTION

1. Field of the Invention

The subject invention relates to the translation of mechanical forces, such as tension and compression, into corresponding electrical signals, and, more specifically, to beam design, diaphragm structure, transducer construction, strain gauge systems, chemical etching or milling methods, and various methods for making stress distribution plates, beams and diaphragms.

2. Disclosure Statement

This disclosure statement is made pursuant to the duty of disclosure imposed by law and formulated in 37 CFR 1.56(a). No representation is hereby made that information thus disclosed in fact constitutes prior art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

Various methods have been employed in the past to improve the performance of strain gauge/diaphragm type pressure transducers, particularly with respect to the location of the strain gauges bonded to the diaphragm to measure the tensile (expansion) and compressive (contraction) strain of the diaphragm when it is subjected to stress in the form of pressure exerted against the diaphragm. Unfortunately, many of such prior manufacturing techniques have become impractical due to the increasing cost of manufacture and the complicated steps that have been employed. Also, many prior devices suffer from inherent instability and a relatively low output of the strain gauges.

These problems are particularly acute in connection with low pressure/small diameter diaphragm type transducers which incorporate integrally bonded strain gauges on the diaphragms. The size of the gauges and their location on the diaphragm are of primary importance in connection with output/input efficiency, stability/time performance, and the effort to obtain linearity and to minimize hysteresis problems.

Ideally, the center of one or more strain gauges is placed to coincide with the center of the maximum amplitude of the tensile strain locations, and another set of gauges is attempted to be placed to overlie a corresponding center for maximum amplitude of compressive strains. In the past a primary problem has arisen with the maximum compression amplitude which is typically at the very outer edge of a conventional diaphragm. Those methods which have sought to distribute this maximum compressive strain location inwardly toward the center have invariably added excessively to the cost of the process and are therefore rather impractical, as well as somewhat unreliable.

Some references of interest are mentioned below in the context of FIGS. 1 to 5 and other parts of the drawings. These references are of record in the parent applications and are herewith incorporated by reference herein.

Further references are also of record or on file in the parent applications and are herewith incorporated by reference herein. By way of example, these include U.S. Pat. No. 3,335,381 by M. Di Giovanni, and U.S. Pat. No. 3,341,794, by C. K. Stedman, utilizing a boss center section supported by an annular flexure region having strain gauges located thereon.

Such prior proposals provide only localized high-stress areas, but provide no significant mechanical amplification.

Also, the proposals just discussed are limited in terms of manufacture to conventional machining, being time-consuming and expensive and being restricted in terms of minimum attainable diaphragm thickness. Because the large central boss or mass places such transducers into the category of accelerometers they are generally useless for dynamic pressure measurements.

Further references of record or on file in the parent applications, including U.S. Pat. No. 4,050,049, by A. P. Youmans, U.S. Pat. No. 4,071,838, B. Block, and U.S. Pat. No. 4,144,516, by H. E. Aine, are limited in terms of photolithographic and etching techniques on silicone wafers and other solid-state materials.

Reference may also be had to U.S. Pat. No. 3,049,685, by W. V. Wright, which shows a diffused silicon beam transducer lacking mechanical amplification.

SUMMARY OF THE INVENTION

It is a general object of this invention to overcome the disadvantages and satisfy the needs set forth or implicit in the above disclosure statement or in any other part hereof.

It is a germane object of this invention to provide improved stress distribution plates, beams and diaphragms, notably for transducers.

It is a related object of this invention to provide improved methods of manufacturing stress distribution plates, beams and diaphragms, notably for transducers.

It is also an object of this invention to provide improved pressure and other transducers and improved methods for making same.

It is a related object of this invention to increase the output of stress distribution plates, beams and diaphragms, particularly in low-range transducers.

It is also an object to improve long-term drift and stability characteristics in stress distribution plates, beams, diaphragms, and pressure transducers and the like.

It is also an object of this invention to upgrade frequency response characteristics of stress distribution plates, diaphragms, beams and transducers.

It is a related object of this invention to provide mechanical advantage or amplification by displacing the neutral stress plane in stress distribution plates, beams and diaphragms relative to the central plane and away from strain gauges or other sensing elements. It is a germane object of this invention to decrease the required magnitude and to increase the quality, including linearity and stability, of transducer output signal amplification by effecting a substantial mechanical amplification in the output signal generation.

It is also an object of the present invention to simplify the method of manufacture of diaphragm plates while at the same time altering the strain characteristics of the diaphragm. More specifically, it is an object of the invention to employ chemical milling techniques to etch predetermined designs on one side of the diaphragm.

Another object of this invention is to provide a method for chemically etching several hundred diaphragms simultaneously on a single piece of sheet-stock. A related object is to etch a central depression on one face of the diaphragm to a thickness half the surrounding thickness of the remaining sheet-stock surface.

Another object of this invention is to chemically etch the outer edge outline of the diaphragm plate from both sides while etching the central portion from one side so that the completion of the outline etching occurs at the same time the central etching has passed half way through the plate wall.

A related object of this invention is to etch the central portion to a first diameter spaced inwardly from the inner wall location of the diaphragm spacer, and to provide cutouts extending into said outer portion to receive strain gauges thereon.

Further purposes, objects, features and advantages of the invention will become apparent in the further course of this disclosure.

While the present invention is suceptible to modifications and alternative constructions, illustrative embodiments are shown in the drawings and will be described in detail herein below. It should be understood, however, that it is not the intention to limit the invention to the particular form disclosed; but on the contrary, the invention is to cover all modifications, equivalences and alternative constructions falling within the spirit and scope of the invention as expressed in the appended claims.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts and in which:

FIG. 3 is a top plan view similar to FIG. 1;

FIG. 4 is a sectional view taken along line 4—4 in FIG. 3 showing the relation between a typical stress curve and the location of the strain gauges to monitor the results of such stress;

FIG. 5 is a top plan view showing the tension and compression zones on a different prior art diaphragm;

FIG. 6 is a sectional view taken along line 6—6 in FIG. 5 showing the relation between a typical stress curve and the location of the strain gauges to monitor the results of such stress;

FIG. 7 is a perspective view of a presently preferred embodiment of the improved diaphragm of the present invention;

FIG. 8 is a sectional view taken along the line 8—8 in FIG. 7;

FIGS. 17 and 17a are schematic sectional view of a diaphragm in the nonpressurized and pressurized states, respectively;

FIGS. 18 and 18a are schematic sectional views of a beam-diaphragm mechanism in the non-pressurized and pressurized states, respectively;

FIGS. 19 and 20 are sectional views of a diaphragm and beam activated pressure transducer illustrating the tetra planar feature of my invention;

FIG. 25 is a top plan view of a diaphragm showing a second preferred embodiment of my invention;

FIG. 26 is a sectional view taken along line 26—26 of FIG. 25, wherein the tension and compression forces on the upper surface of the beam of the diaphragm activated pressure transducer are illustrated by dotted lines;

FIG. 27 is a sectional view taken along line 27—27 of FIG. 25;

DESCRIPTION OF PREFERRED EMBODIMENTS

Figure 1:
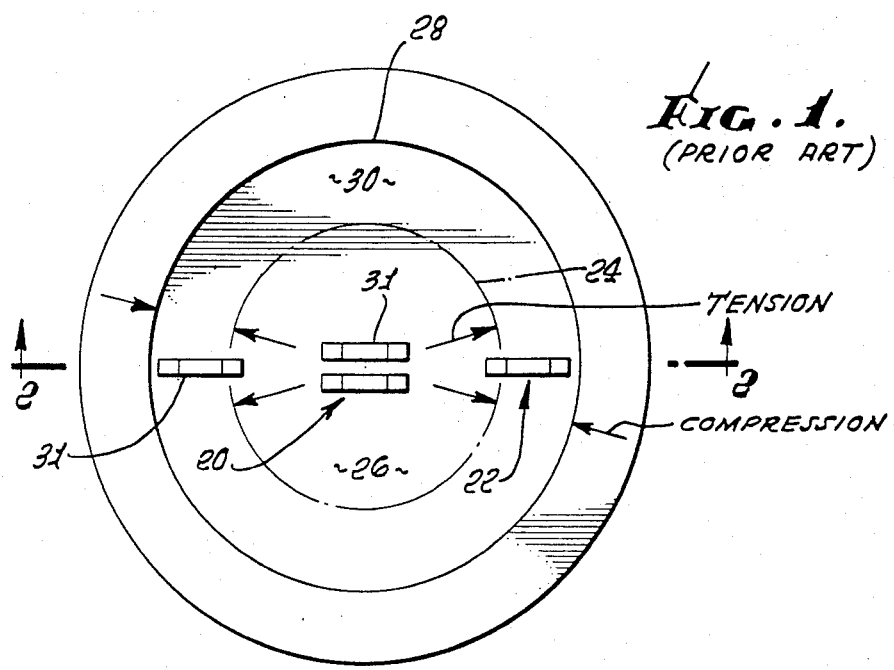
FIG. 1 is a top plan view showing the tension and compression zones on a conventional prior art diaphragm.
Figure 2:
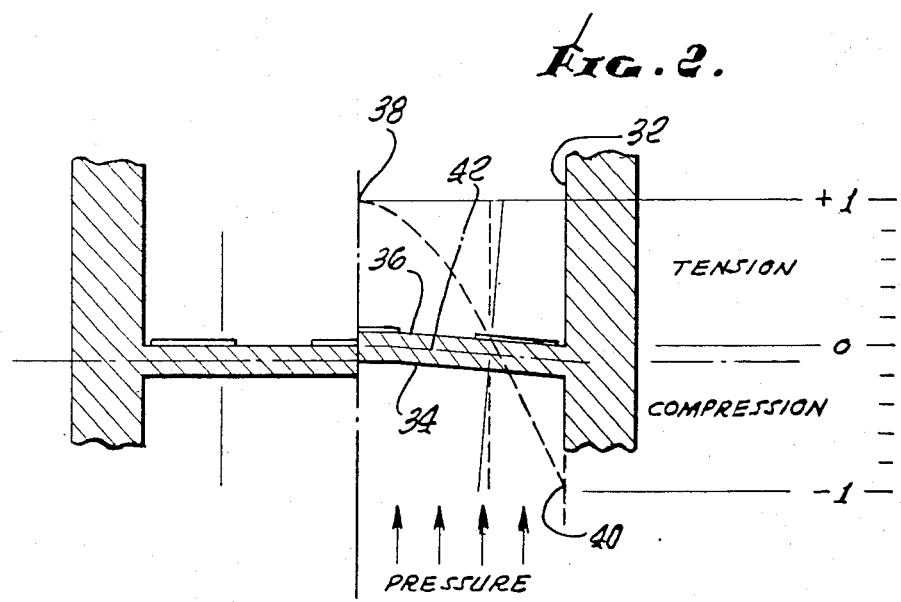
FIG. 2 is a partially schematic sectional view taken along line 2—2 in FIG. 1 showing a typical stress curve for the diaphragm under pressure, superimposed over its actual movement.

By way of background, FIGS. 1 and 2 illustrate a classical clamped edge diaphragm transducer including tensile strain gauges 20 and compressive strain gauges 22 mounted on the rearward surface of a circular, clamped edge diaphragm plate. More specifically, the tensile strain gauges 20 are mounted inside a boundary line 24 which circumscribes a tension zone 26 in which the diaphragm plate expands when subjected to pressure on the forward face of the plate. Compressive strain gauges 22 are sought to be mounted between line 24 and a line 28 which define or bound a compression zone 30 in which the diaphragm plate compresses and contracts when subjected to pressure on the forward face thereof.

In terms of maximum sensitivity, it would be advantageous to locate the center of the sensor portion 31 of the gauge directly over the point of maximum amplitude of the particular strain characteristic being measured, such as tension or compression. However, as seen in FIG. 2, the interior spacer or housing wall 32 in effect serves as a barrier making it impossible to properly locate the compressive strain gauges 22. In this respect, the interior spacer or housing wall 32 is integral with the clamped edge diaphragm and defines the circular line 28 which is the outer boundary of the compressive zone 30. As also seen in FIG. 2, the application of pressure to the front or forward face 34 of the diaphragm creates a strain in the diaphragm plate manifested by tension on the rear face 36 which reaches a maximum amplitude at point 38, and further manifested by compression of the plate which reaches a maximum compression amplitude point 40; that is, along the line 28 defined or immediately adjacent the interior spacer or housing wall 38.

The inevitable spacer or housing wall 32 of the illustrated classical clamped edge diaphragm transducer structure thus renders it impossible to place the center of any sensor portion directly over the point of maximum compression amplitude 40.

The showing of FIGS. 1 and 2 is juxtaposed on a reduced scale in FIGS. 3 and 4 to the showing, in FIGS. 5 and 6, of a conventional modification of the classical design described above with reference to FIGS. 1 and 2.

In particular, the conventional modification according to FIGS. 5 and 6 provides a new or shifted maximum compression amplitude point 40 with the aid of a beveled edge 44 and a thickened spacer or housing wall at 46 changing the classical center plane 42 of the diaphragm plate shown in FIG. 2 and enabling positioning of the sensor portion 31 of the strain gauges 22 over the maximum stress point 40.

In practice, this and similar measures to increase sensitivity, such as illustrated in U.S. Pat. No. 3,325,761 by W. H. McLellan, and U.S. Pat. No. 3,434,090, by H. Chelner, typically require implementation by expensive and often complex machining, imposing a natural limitation on attainable minimum diaphragm thickness.

In this respect, high-pressure transducers can tolerate a relatively thick diaphragm. Also, prior-art devices have sometimes increased the thickness of the diaphragm in order to increase long term stability. This, however, has resulted in decreased strain output for a given pressure range, with thickness, t, being related to pressure, P, through the intermediary of a constant, K, according to the basic equation:

$$t = K\sqrt{P} \tag{1}$$

Referring to FIGS. 1 and 2, equation (1) applies well to the classical clamped edge circular diaphragm to uniform thickness, wherein the center plane 42 divides the tension (T) and compression (C) stresses so that they are approximately equal on each side of such central plane (CP).

In the case of lower pressure ranges, such as ranges below 1000 mmHg (for example 0 to 300 mmHG required for physiological pressure transducers), the ratio of the thickness of the strain gauges to that of the diaphragm itself becomes significantly larger than in the case of higher pressure ranges, and the distance from the strain gauge to the center plane 42 (CP) becomes smaller, yielding a smaller and less stable output.

From one aspect thereof, the subject invention in effect provides the advantage shown in FIG. 6 without incurring the disadvantages associated with that conventional design.

Figure 9:
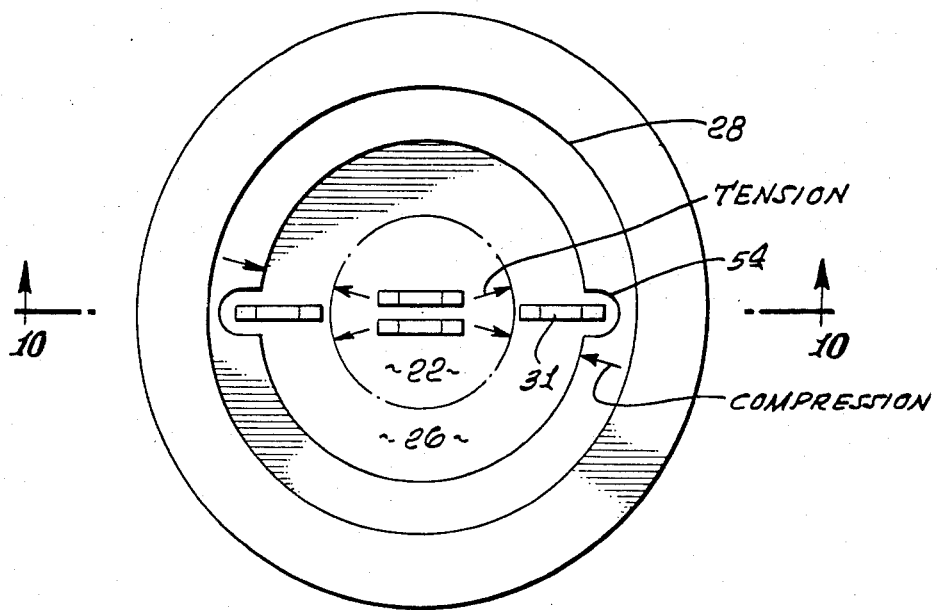
FIG. 9 is a top plan view showing the tension and compression zones on the diaphragm of FIG. 7.
Figure 10:
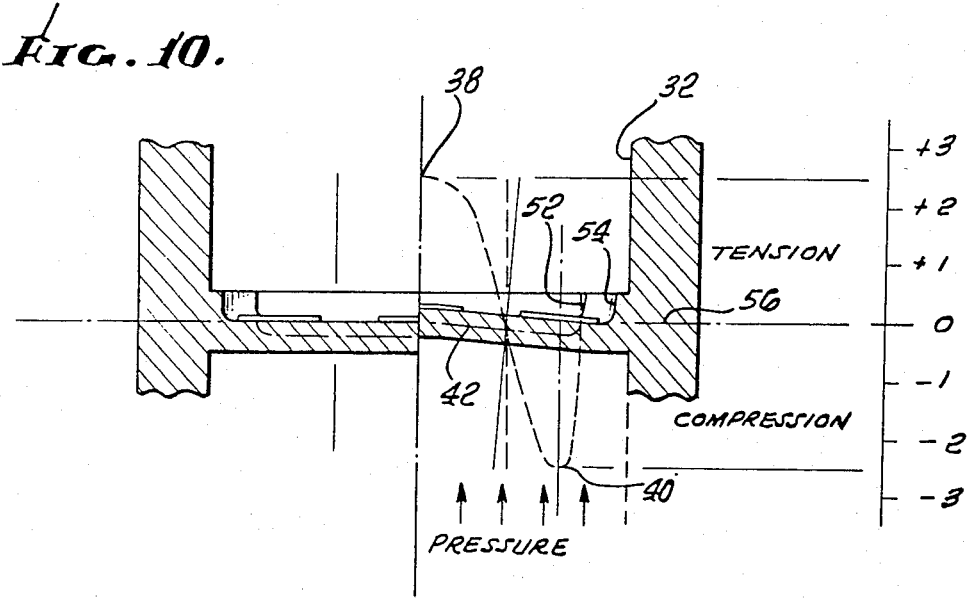
FIG. 10 is a partially schematic sectional view taken along line 10—10 in FIG. 9 showing a stress curve for the improved diaphragm under pressure, superimposed over its actual movement.
Figure 11:
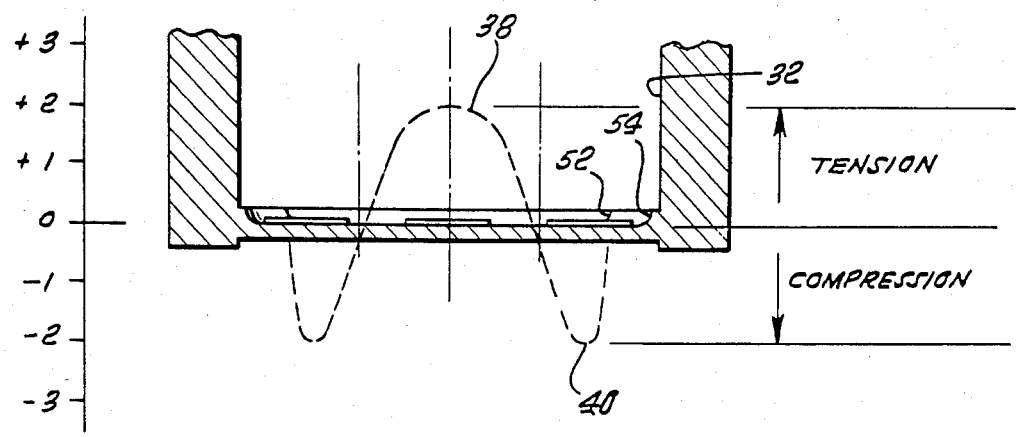
FIG. 11 is a sectional view of the improved diaphragm of FIG. 7 showing the relation between a stress curve and the location of the strain gauges to monitor the results of such stress.

In particular, the subject invention, from one aspect thereof, provides as shown by way of example in FIGS. 7 to 11 an improved transducer diaphragm suitable for mounting around its periphery to a cylindrical spacer, such as the spacer or housing portion 32 shown in FIGS. 10 and 11. The diaphragm according to the current aspect of the invention, comprises a plate having an even back surface and a multilevel front surface, which front surface includes at least two symmetrically positioned rear portions 54 overlying a maximum strain amplitude section of the plate (see 40 in FIGS. 10 and 11). A strain gauge is mounted in, or extends into, each of the recesses 54, as seen in FIGS. 9 to 11.

The expressions "front surface," "back surface," "forward face," "rearward surface," and expressions of like import are, of course, relative expressions and may, therefore, be interchangeably employed. For instance, the diaphragm just described is, according to a preferred embodiment of the subject invention, intended to measure pressure exerted against the mentioned back surface, and a strain gauge 31 is mounted in the recess portions 54 which overlie a maximum compression strain amplitude section 40 of the plate.

From a similar aspect thereof, the subject invention provides an improved transducer diaphragm comprising an outer peripheral portion 48 having a thickness greater than and separated by a boundary 52 from its central sensory portion 50. The boundary 52 defines at least one offset 54 of the central portion 50 extending into and partially bounded by the peripheral portion 48 for receiving a strain gauge 31 which can be mountable solely on the central sensory portion and substantially overlying the location of maximum compression amplitude 40 of the diaphragm.

According to the preferred embodiment of the invention illustrated in FIGS. 7 to 11, there are at least two offsets 54 at the central portion 50 on opposite edges of the diaphragm. In other words, the two offsets or notches 54 preferably are diametrically opposite from each other.

From another aspect thereof, the subject invention provides a method of making a transducer diaphragm employing a chemical etching process in combination with a masking technique to control the thickness and the diameter of the active area of the diaphragm, such diaphragm being designed for carrying strain gauges bonded on one face of the diaphragm within the inside edge of an annular support wall 32. The invention according to the currently discussed aspect thereof resides, more specifically, in the improvement comprising an etching process including the step of etching one face of the diaphragm to chemically mill out a central recess 50 which forms the active portion of the diaphragm as defined by an outer boundary and having a uniform thickness within the boundary with the diameter of the central recess appreciably less than the inner diameter of the annular support wall 32 to displace the active portion of the diaphragm inwardly from the inside edge of the annular support wall, and to chemically mill a peripheral notch 54 extending from the central recess 50 into the nonactive portion of the diaphragm for receiving a compression-sensitive strain gauge 31.

In accordance with a preferred embodiment, the etching step includes chemically milling a central recess 50 having a diameter which is essentially 75-80% of the inner diameter of the annular support wall 32.

According to the illustrated preferred embodiment shown in FIGS. 7 to 11, the etching step includes chemically milling a pair of peripheral notches displaced 180° apart.

By way of example, the mentioned etching step includes milling the central recess 50 on one face of the diaphragm and simultaneously milling the marginal edges 54 of the diaphragm on opposite faces of the diaphragm to achieve a uniform thickness for the central recess which is essentially one-half the thickness of the non-active portion or circular edge of the diaphragm.

Generally speaking, the chemical milling process is not limited to circular geometry and therefore lends itself to other geometrical patterns more advantageous in achieving an optimized diaphragm construction. By way of recapitulation, in the conventional clamped edge diaphragm the center plane is the neutral zone when pressure is applied within the range of the transducer (see FIG. 2). The distribution of the tension and compression strain and their amplitudes on the inside surface is well known as shown. The performance problems arise from the fact that it is physically impossible to place the compression gauges at the optimum location (see FIGS. 2 and 4). Other methods and designs have overcome this problem at increased unit cost (see FIGS. 5 and 6).

Chemical milling (i.e., etching), was discovered to be a unique solution of this problem and at a substantial reduction in cost of manufacturing. Several hundred diaphragms can be milled simultaneously on a single piece of sheet stock of the proper material twice the thickness of the final diaphragm thickness.

Known photo-lithographic masking techniques are used to generate the dimensions and pattern desired from the applicable blueprint. The outline is etched from both sides to the center plane. The inside of the diaphragm is etched to a diameter 75-80% of the inside diameter of the supporting wall (spacer) to the center plane, and including in the illustrated embodiment two cut-outs at the periphery 180° apart to accommodate one end of each of the compression gauges (see FIG. 9). Subsequently when the gauges are bonded to the diaphragm, the ends of the compression gauges are then positioned in the neutral zone in the cut-outs near the edges (see FIG. 10). Through the etching process of the center portion of the diaphragm the center plane is shifted to a new location for that portion of the diaphragm which is in the center plane of the half thickness remaining (see FIGS. 10 and 11).

The welding process takes place between the etching and the application of the gauges, and is detailed in my copending patent application Ser. No. 71,807, entitled Transducer Diaphragm Elements and Methods and Apparatus for Making Same (now U.S. Pat. No. 4,291,218, issued Sept. 22, 1981).

The currently discussed aspect of the invention etches a decreased thickness portion or depression 50 within a boundary 52 which has one or more symmetrically spaced cut-outs 54. This causes a new neutral plane or center line 56 to create a maximum compression amplitude point which can be accurately and precisely monitored by the sensor portion 31 of a strain gauge 22 mounted on the rearward face of the plate and partially extending into the cut-outs or notches offset from the main central portion.

Even though this exemplary embodiment provides for both the compression and expansion strain gauges to be mounted within the depressed portion of the plate, the unique application of the etching technique can be used to provide a multi-layer face on a diaphragm plate in a predetermined pattern such that certain of the sensors could be placed on the raised or thicker portion of the plate.

Also, even though this illustrated embodiment has the monitor spaces on the rearward face of the plate on the side opposite to where the pressure is being exerted, it is within the scope of the invention to mount the strain gauges on the level face of the plate in order to achieve the optimum monitor position for the gauges.

Figure 12:
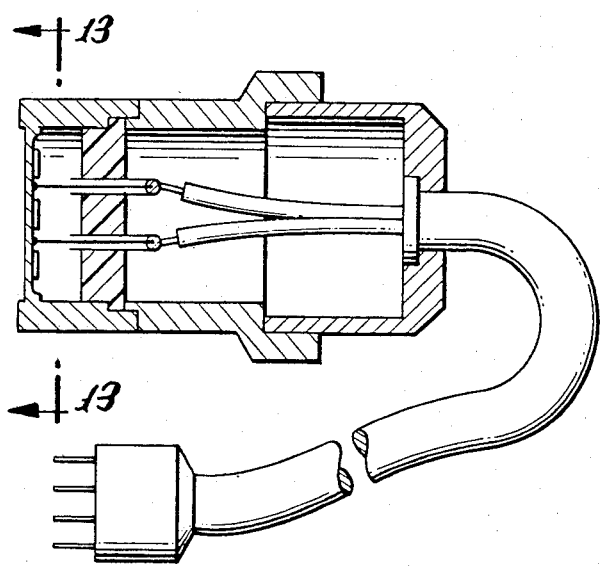
FIG. 12 is a partial sectional view showing a transducer incorporating the improved diaphragm of the present invention.
Figure 13:
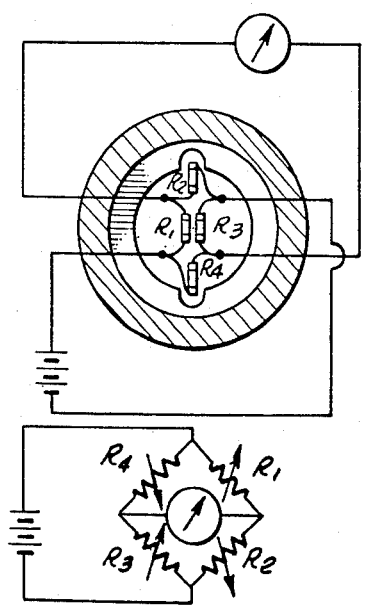
FIG. 13 is a sectional view taken along line 13—13 in FIG. 12 which also shows an analogous Wheatstone bridge circuit.

FIGS. 12 and 13 illustrate the structural mounting and electrical wiring typically employed with the present invention in combination with the improved plate-monitoring features described above. In particular, the four strain gauges, having variable resistances $R_1$ to $R_4$, are bonded at select locations as herein disclosed, and their leads are connected to form the classical Wheatstone bridge (WB) which translates the diaphragm deflection caused by the pressure (P) into a directly proportionate electrical analog signal (SIG) at a given excitation voltage (EXC) to the bridge.

It will be appreciated by those skilled in the art that the invention enables the strain gauge sensor to be placed on a diaphragm in an optimum position to measure the action or activity of the diaphragm when it is subjected to pressure directed against one side thereof.

As described, the invention preferably uses two sensors symmetrically positioned relative to the edge of the diaphragm where it connects at its outer boundary in order to accurately monitor the movement of both edges of the diaphragm. Thus, as one portion of the diaphragm contracts while other portions of the diaphragm expand, the invention provides two different ways of accurately measuring the same phenomenon; namely, the pressure being exerted against the surface of the diaphragm. In contrast to conventional construction, it is possible to position the sensors directly over the portions of the diaphragm where maximum contraction and/or maximum expansion occur. In this regard, it is the notches or offsets which have been etched around the periphery of the diaphragm which enable the sensor to be positioned so that the central portion of the sensor directly overlies that part of the diaphragm which has the most flexing movement in terms of maximum compression.

Figure 14:
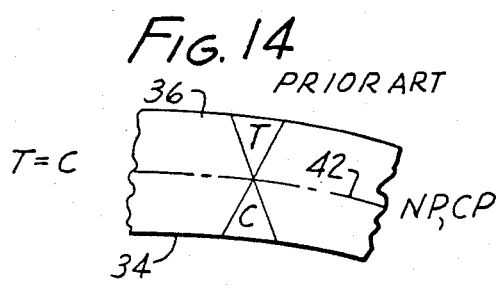
FIG. 14 is an enlarged schematic sectional view showing a typical curve for a prior-art cantilever beam or diaphragm.

By way of further background, FIG. 14 shows a fraction of a conventional diaphragm (see FIG. 2) or of a conventional cantilevered beam in which the central plane (CP) 42 is midway between the upper surface 36 and the lower surface 38, and in which the neutral stress plane (NP), as usual, is coincident with the central plane (CP). The neutral plane (NP) may be defined as the plane separating the tension and compression functional components of a diaphragm or beam. Reference may in this respect be had to the above mentioned U.S. Pat. No. 3,049,685, by W. V. Wright, which in its FIG. 3 shows the equal or non-amplifying compression and tension stress relationship in a conventional beam having coinciding central and neutral axes or planes.

It may be seen from FIG. 14 that the magnitude of the tension (T) and the compression (C) components increases with increasing distance from the neutral plane (NP). In the classical transducer diaphragm shown, the instance, in FIG. 2, and in conventional cantilever beams, the tension (T) and compression (C) components are essentially equal in magnitude (T=C) and the neutral stress plane (NP) coincides with the central plane.

Against this background, the subject invention provides a method of manufacturing a stress distribution plate for a pressure transducer having a central plane (CP) and a neutral stress plane (NP), and resides in the improvement comprising displacing the neutral stress plane (NP) from the central stress plane. The subject invention provides a stress distribution plate for a pressure transducer having a central plane (CP) and a neutral stress plane (NP), with the neutral stress plane (NP) being displaced from the central plane (CP).

According to an aspect of the subject invention, certain conditions may be changed or altered so that the resultant magnitude of the tension (T) and compression (C) are increased or amplified, providing an increased strain output which may be used advantageously as it occurs. Alternatively, we may choose to increase the total thickness dimension for greater stability, without sacrificing strain output for a given pressure range. Reference may in this respect be had to the above equation (1) and its accompanying text. If desired, both an increased strain output and an increase in the total thickness dimension of the diaphragm or stress distribution plate may be achieved according to preferred embodiments of the subject invention.

Figure 15:
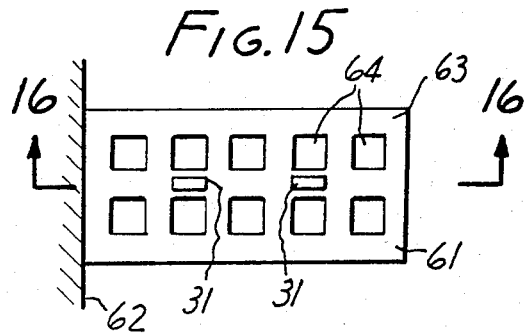
FIG. 15 is a top plan view of a cantilevered beam having recesses to displace the neutral plane according to an embodiment of the subject invention.
Figure 16A:
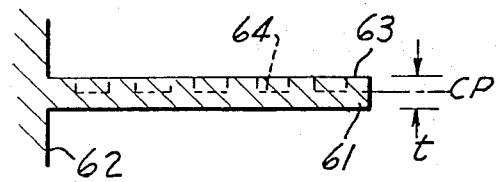
FIGS. 16a, 16b and 16c are sectional views taken along line 16—16 of the cantilevered beam of FIG. 15 showing the beam with a downward force applied to it and with an upward force applied to it.

Referring now to FIGS. 15 and 16a, there is shown a cantilevered beam 61 affixed to a wall support 62. The cantilevered beam 61 has an upper surface 63 having a plurality of recesses 64 therein. In contrast to prior-art structures having occasional recesses for stress concentration, the recesses 64 on the cantilevered beam 61 or on a transducer diaphragm are sufficiently frequent to justify use of the adjective "lacunose" for the surface 63 or generally for the beam 61 or equivalent diaphragm. The English dictionary work "lacunose" in this respect stems from the Latin word lacunosus, meaning "full of lacunae." Lacunae, on the other hand, are defined as recesses, spaces, cavities and depressions. By way of illustration, reference may, in this respect, be had to the lacunaria on the inside of the cupola of the Pantheon in Rome and the coffer vault of the Basilica of Constantine in Istanbul, characterized by a multitude of depressed panel regions. However, the subject invention and its embodiments are not limited to such architectural forms, as may, for instance, be seen in the further course of the subject disclosure.

According to the currently discussed aspect of the subject invention, the lacunae 64 or the lacunose nature of the surface 63 or beam 61 effect a displacement of the neutral stress plane (NP) relative to the central plane (CP) in a beam or equivalent diaphragm, with corresponding changes in the tension (T) and compression (C) component relationships.

The term "isogrid structure" may also be employed in connection with stress distribution plates, beams and diaphragms of the subject invention (cf. Paul Slyth, *The Isogrid, King of Lightweight Design*, MACHINE DESIGN, Apr. 19, 1973, pp. 102–107).

Figure 16D:
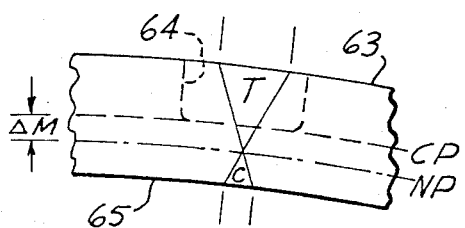
FIGS. 16d and 16e are enlarged schematic sectional views of the indicated portions of FIGS. 16b and 16c, respectively, showing the stress experienced by the beam.
Figure 16B:
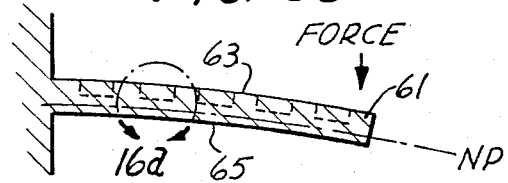
Figure 16E:
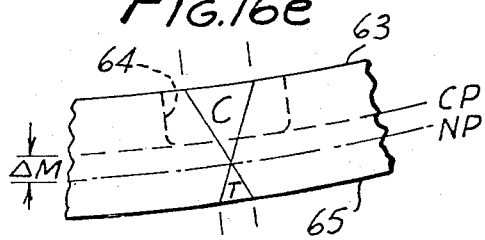

As seen in FIGS. 16b and 16e, the neutral stress plane (NP) is shifted away from the central plane (CP) toward the lower surface 65, to be located between the central plane and such lower surface. In particular, the neutral plane (NP) is displaced from the central plane (CP) by a distance $\Delta M$.

Figure 16C:
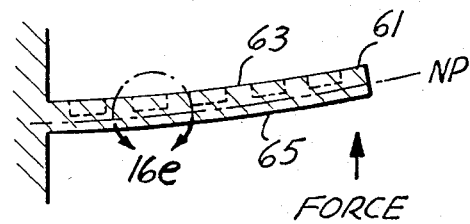

When a downwardly directed force is applied to the beam 61 as shown in FIG. 16b, the resultant tension (T) on the upper surface 63 will be amplified as shown in FIG. 16d due to the downward displacement of the neutral plane (NP) relative to the central plane (CP) by a distance equal to $\Delta M$. Similarly, when an upper force is applied to the beam 61 as shown in FIG. 16c, the resultant compression (C) is also amplified as seen in FIG. 16e due to the mentioned downward displacement of the neutral plane (NP) relative to the central plane (CP) by the distance $\Delta M$.

As shown by way of example at 31 in FIG. 15, strain gauges are bonded to the diaphragm or beam 61 is coincidence with regions or isthmi located between lacunae 64 of the lacunose surface region 61. This, for instance, distinguishes the illustrated preferred embodiments from such proposals as advanced in U.S. Pat. No. 3,520,191 by Hasai-Si Pien, and U.S. Pat. No. 4,103,273, by H. W. Keller, where strain gauges are bonded in coincidence with recesses or depressions.

The expressions "diaphragms," "beams," "stress distribution plates" and expressions of like import are herein interchangeably used and are intended to signify in the subject disclosure and in the claims like and functionally equivalent parts and structures.

In the practical application of the principles herein disclosed, diaphragms, beams and stress distribution plates can now be manufactured in multiples from appropriate thicknesses of sheetstock or metal, employing photo-lithographic masking techniques and chemical milling to selectively etch any predetermined pattern of equal or unequal geometry on each side or simultaneously on both sides of the center plane (CP) of the material. Simultaneous etching on both sides of the material may proceed at the same rate. Reference may in this respect be had to my etching methods set forth above, as well as to the disclosure of my U.S. Pat. No. 4,133,100 issued Jan. 9, 1979 for Method of Making Diaphragm of Optimized Stress and Strain Distribution, which is herewith incorporated by reference herein and from which the subject application or patent claims priority under 35 USC 120 and 121.

Additional features of my invention concern the discovery or invention of designs and patterns for diaphragms and beam which result in a displacement geometry, with pressure or force, of a tetra planar configuration which intrinsically tends to generate nearly equal stress levels of the compression and tension components of the system, though being not necessarily restricted to such a feature.

By way of background, the magnitude of stress levels may be graphically represented by angles shown in FIGS. 17, 17a, 18 and 18a.

In particular, FIGS. 17 and 17a diagrammatically show a diaphragm 57 clamped to an interior wall 62, without pressure applied and with pressure applied, respectively. Similarly, FIGS. 18 and 18a show a beam 68 abutting and activated by a diaphragm 67. Such diaphragm and beam 68 are shown without external pressure applied (FIG. 18) and with external pressure applied (FIG. 18a), respectively.

Pursuant to elementary geometry, the angle a is equal to twice the angle b in FIG. 17a. Therefore, the tension output (T) is nominally twice the compression output (C) and thus increases the bridge impedance directly proportional to pressure or force when a Wheatstone bridge circuit is employed as the sensing agency of the strain gauge components.

In the arrangement of FIG. 18a, the compression sensing elements must be mounted on the upper side of the beam 68, and the tension sensing elements directly opposite on the lower side of the diaphragm 67. Also, the compression sensing elements and the tension sensing elements nominally have equal output. In terms of subsequent processing or even in terms of manufacture, it is, however, frequently not expedient to mount the different gauges on different sides or to moutn the lower gauges in a relatively inaccessible location. This is particularly disadvantageous when high temperaure processes are required, such as welding, brazing or heat treating, in the manufacture or processing of the transducer.

According to preferred embodiments of the subject invention, the problem illustrated with the aid of FIGS. 17a and 18a are overcome by management of the stress and strain locations, preferably by means of properly located relatively rigid and compliant sections or areas in a geometrical manner whereby stress concentration locations are optimized, the tension and compression strain gauges are all on one side of the beam structure or diaphragm, the compression and tension outputs are equalized for the maintenance of an ideally stable bridge impedance condition throughout the entire pressure/force range of the transducer. A further important feature includes the shifting of the neutral stress plane (NP) away from the sensing elements or strain gauges and the central plane (CP) whereby to effect a calculated mechanical advantage or amplification providing an increased transducer output or alternatively allowing an increase in beam or diaphragm thickness for increased stability, without the type of output loss penalty incurred with prior-art devices when the beam or diaphragm thickness was increased. To the contrary, the structures of my invention are more rigid and stable, enhancing the ultimate performance and stability of my transducers.

As a result of the lacunose diaphragm or beam structure or the plurality of recesses provided according to my invention, my beams and diaphragms present a lighter structure, which improves the frequency response characteristic of the beam or diaphragm because of a reduced mass. In fact, embodiments of my invention permit very significant mass reductions because of the relatively high stiffness afforded by lacunose or isogrid-type structures of the kind herein disclosed. A further advantage of my shift of the neutral plane relative to the central plane will appear from FIGS. 19 and 20.

Sample graphic illustrations of tetra planar beams and diaphragms according to an aspect of my invention are shown in FIGS. 19 and 20. In these diaphragm designs, the angle a is made equal to the angle b, rather than being twice as high as in FIG. 17a. Since the two angles a and b are nominally equal, the compression (C) and the tension (T) components are nearly equal. The double end supported beam shown in FIG. 20 may, if desired, be formed as a single end supported or cantilevered beam.

In either case, the fact that the angle a is equal to the angle b in the embodiments of FIGS. 19 and 20 and in the single end supported beam just mentioned provides for an equalization of the compression and tension outputs to maintain a stable bridge impedance condition throughout the pressure/force range of the transducer. As also shown in FIGS. 19 and 20, my preformed diaphragm and beam structures also provide for a shifting of the neutral plane (NP) relative to the central plane (CP) whereby the mechanical advantage or amplification explained above with the aid of FIGS. 16d and 16e is again realized. In the embodiments of FIGS. 19 and 20, the tension and compression sensing elements or strain gauges may be located on the upper surface of the diaphragm or beam.

Next referring to FIGS. 21 to 30 collectively, there are shown therein three preferred embodiments of my invention. For the sake of simplicity, all three will first be discussed jointly.

In particular, a stress distribution plate or diaphragm 71 having a pattern of mesas 72 and recesses 73 formed on one surface thereof is shown supported by conventional means, such as an edge clamping spacer or housing 32.

Overlying the surface of the plate at predetermined areas of the mesas are a plurality of strain gauges 74 for measuring the tension and compression forces in these predetermined areas. The areas whereon the strain gauges are located are thoses wherein the compression and tension forces are equal and are a maximum so as to maximize the output of the strain gauges and to have them in balance in the Wheatstone bridge, which is the customary manner of electrically connecting the strain gauges so as to measure the pressure.

Figure 22:
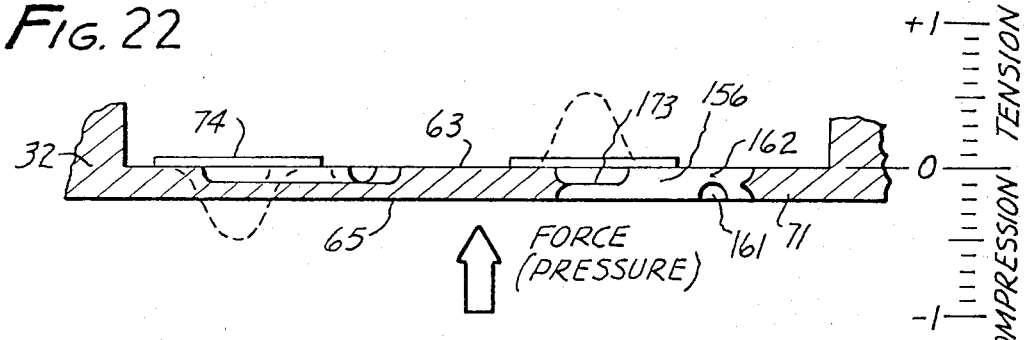
FIG. 22 is a sectional view taken along line 22—22 of FIG. 21, wherein the tension and compression forces on the upper surface of the diaphragm are illustrated by dotted lines.
Figure 29:
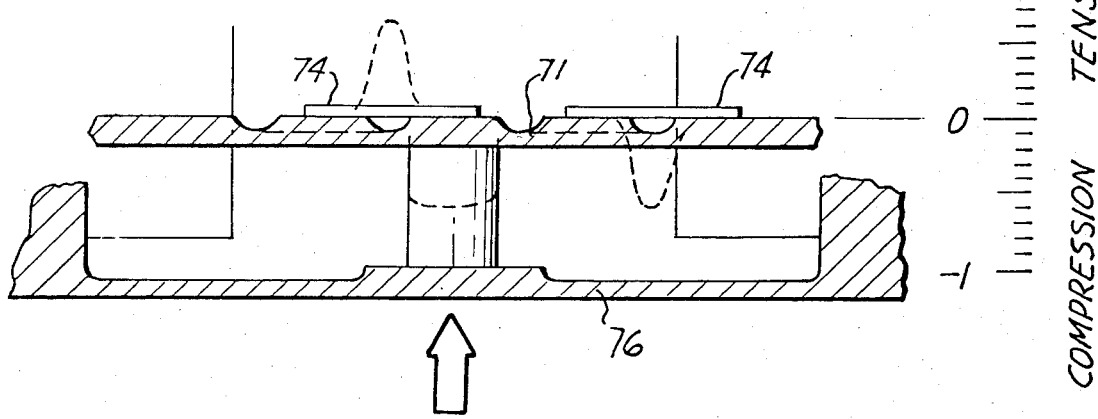
FIG. 29 is a sectional view taken along 29—29 of FIG. 28, wherein the tension and compression forces on the upper surface of the beam have been superimposed by dotted lines.

As force is applied to the plate 71 the tensions and compression forces which are illustrated by dotted curves in FIGS. 22, 26 and 29 act upon the strain gauges 74, thus producing the electrical outputs which correspond to the force applied.

The plates shown in FIGS. 25 to 30 are of the beam type wherein the force transmitted to the plate 71 is transferred from a pressure sensing element 76 to the plate 71 by means fo a force transfer beam or rod 77. As will be understood by those having ordinary skill in the art, the plates in the beam-type pressure transducers shown are mounted in a conventional manner within the pressure transducer housing.

By way of example, the plates 71 of my invention may be mounted in a manner well known to those having ordinary skill in the art within conventionally designed pressure transducer housings and are electrically connected in a manner also well known to those having ordinary skill in the art for monitoring of the electrical output of the strain gauges as a function of the force applied to the diaphragm plate.

Figure 21:
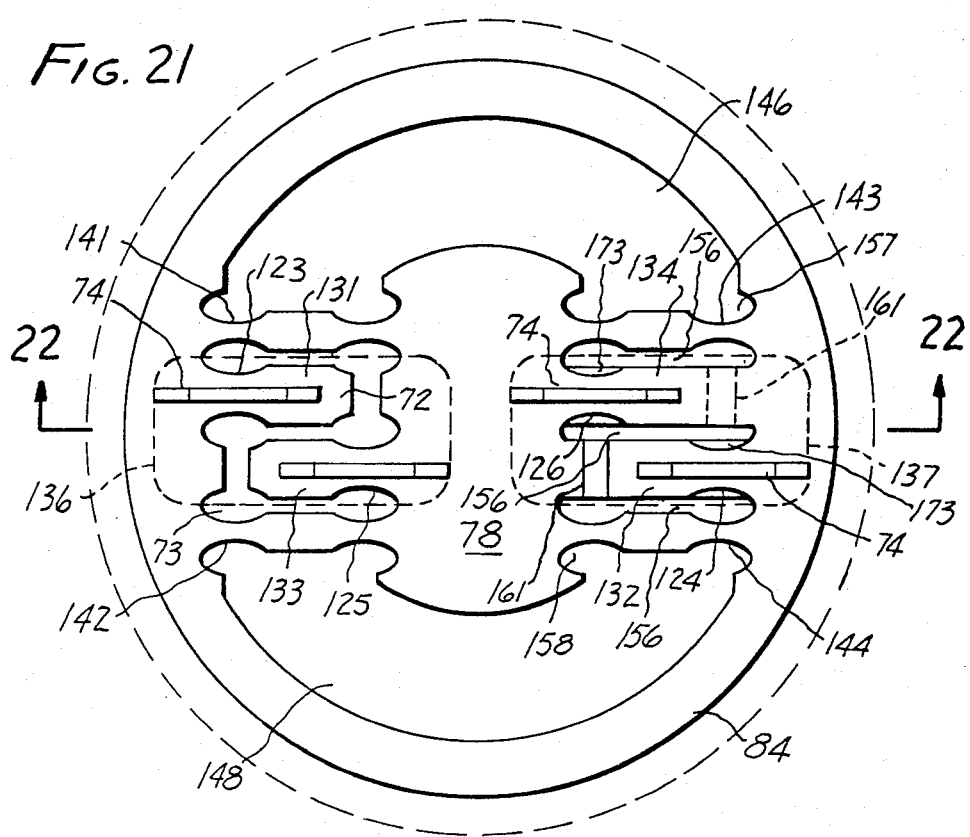
FIG. 21 is a top plan view of a diaphragm showing a preferred embodiment of a pattern of recesses and mesas to optimize the performance or the diaphragm.

In terms of FIGS. 21 et seq. and with reference to FIGS. 15 to 16c it may be said that the plate 71 is provided with a first surface 63 and a second surface 65 at opposite sides of a central plane (CP), and with a predetermined pattern of mesas and recesses 72 and 73 on the first surface displacing the neutral stress plane (NP) from the central plane. The mesas 72 are preferably provided with surface areas located on the first surface 63 to produce maximum areas of tension and compression in predetermined areas of the first surface 63 when the plate 71 is under stress.

Figure 23:
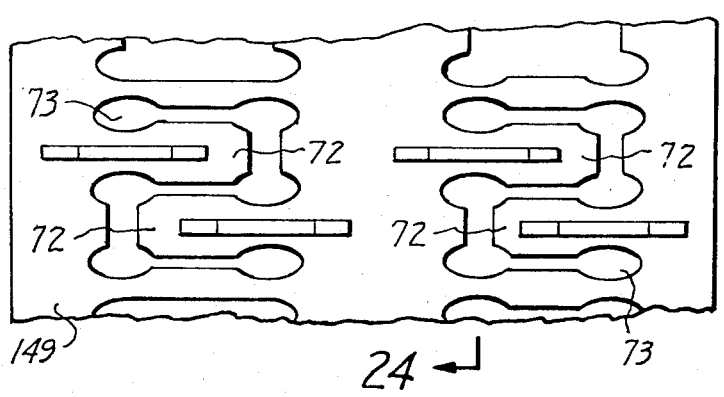
FIG. 23 is an enlarged plan view of the central portion of FIG. 21.

According to a preferred embodiment of my invention, the predetermined pattern of mesas 72 and recesses 73 is provided symmetrically to a central axis of the plate 71, as seen in FIGS. 23 et seq. The predetermined pattern may be provided with recesses 73 displaced from a central area 78 of the plate 71. Such displaced recesses 73 preferably are provided symmetrically about an axis normal to the central axis.

As seen in FIGS. 21 et seq., the predetermined pattern may be provided with identical recesses 73 and mesas 72 on both sides of the central axis of the plate 71.

Most advantageously, especially for mass production, the predetermined pattern of mesas and recesses is formed by a chemical etching process.

A method according to a preferred embodiment of the subject invention of making a stress distribution plate for use in a pressure transducer resides in the improvement comprising, in combination, the steps of forming a plate 71 with an upper surface 63 and with a lower surface 65 extending parallel to the upper surface, providing a neutral pressure plane coincident with the central plane, and concentrating the stress experienced by the plate to predetermined areas when the plate is flexed, by removing predetermined portions from the plate at the upper surface 63 until the neutral plane (NP) is displaced from the central plane (CP). The predetermined portions just referred to are preferably removed by chemical etching such predetermined portions away from the plate at the upper surface 63.

The currently discussed aspect of my subject invention thus provides means including the strain gauge plate 71 having a plurality of recesses 73 in the first surface 63 for displacing the neutral stress plane (NP) from the central plane (CP). Strain gauge means or elements 74 are mounted on the first surface 63 between the recesses 73. For instance, the strain gauge elements 74 may be connected in a Wheatstone bridge arrangement and may be individually mounted between recesses 73 on the first surface 63.

Figure 31:
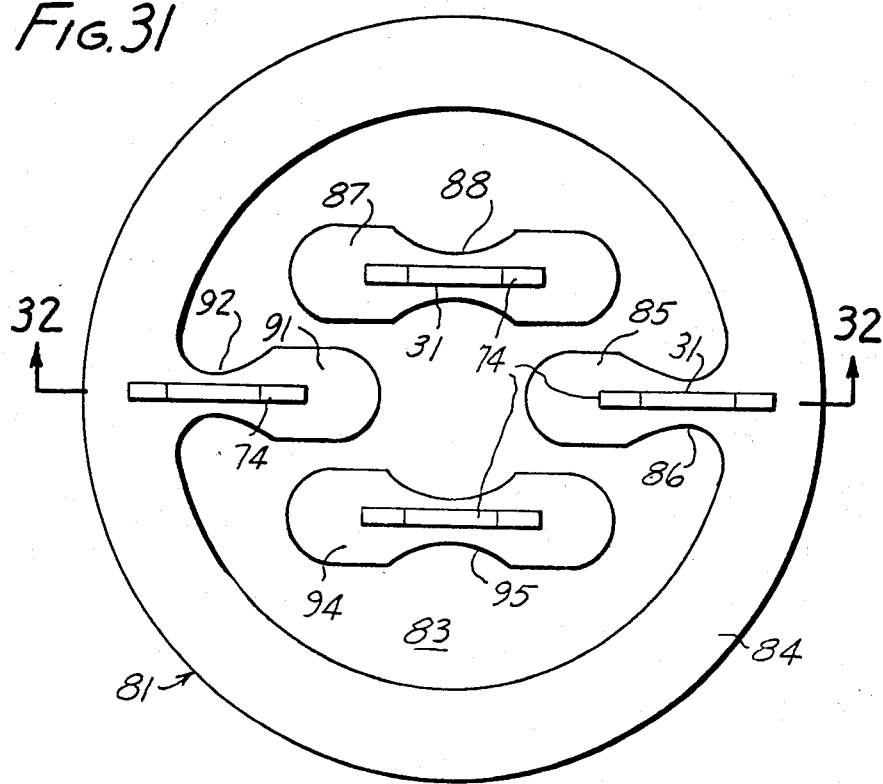
FIG. 31 is a top view of a diaphragm according to a further embodiment of the subject invention.

FIGS. 31 et seq. illustrate further embodiments of my invention. In the description and claims of these embodiments, the expression "transducer diaphragms" is frequently employed. As indicated above, such expression is, however, intended to be broad enough to extend to beams and stress distribution plates.

Figure 32:
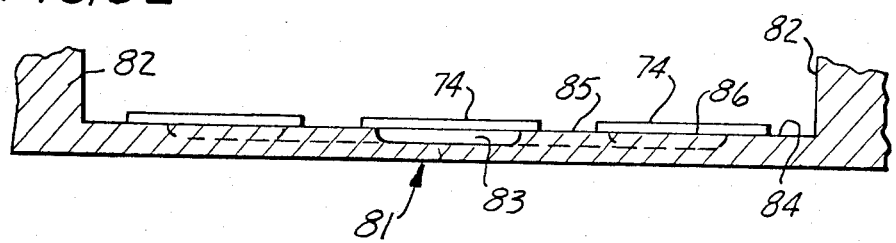
FIG. 32 is a section taken along line 32—32 in FIG. 31.

The transducer diaphragm 81 shown in FIGS. 31 and 32 may be edge clamped as shown at 82 in FIG. 32. The diaphragm 81 has or is provided with a recess 83 encompassed by a circumferential edge region 84 of the diaphragm. A promontory 85 projects from the edge region 84 into the recess 83 and is integral with the diaphragm 81. A strain gauge 74 is bonded to the diaphragm 81 in coincidence with the promontory. As seen in FIGS. 31 and 32, the strain gauge 74 may extend from coincidence with the promontory 85 into coincidence with part of the edge region 84 adjacent the promontory.

In the illustrated embodiment, the promontory 85 has the form of a peninsula located in the recess 83 and connected to the edge region 84 by an isthmus 86. The strain gauge 74 is bonded to the diaphragm in coincidence with the isthmus 86 and with adjacent portions of the peninsula at 85 and of the edge region 84. In particular, the center of the sensor 31 may extend along the isthmus 86.

As further seen in FIG. 31, a raised island 87 may be located in the recess 83, spaced from the promontory 85 and from the edge region 84 and integral with the diaphragm 81. A further strain gauge 74 is bonded to the diaphragm in coincidence with the island 87.

The spaced island 87 may be provided with an isthmus 88 interconnecting two main portions of the island. A further strain gauge 74 or a center portion 31 thereof is bonded to the diaphragm in coincidence with the isthmus 88 of the spaced island 87.

According to the preferred embodiment of my invention illustrated in FIGS. 31 and 32, suitable for the provision of a Wheatstone bridge incorporating the sensor 74, there is provided, in addition to the first promontory 85, a second promontory 91 separate from the first promontory 85 and projecting from the edge region 84 into the recess 83 diametrically opposite from the first promontory 85. Like the first promontory, the second promontory 91 is integral with the diaphragm 81.

In addition to the first strain gauge 74 bonded to the diaphragm in coincidence with the first promontory 85, there is a second strain gauge 74 bonded to the diaphragm in coincidence with the second promontory 91. This second strain gauge also may extend from coincidence with the second promontory 91 into coincidence with a second part of the edge region 84 adjacent such second promontory. This second promontory 91 also may have the form of a second peninsula located in the recess 83, spaced from the first peninsula 85, and connected to the edge region 84 by a second isthmus 92. The second strain gauge 74 or a central sensor portion thereof may then be bonded to the diaphragm 81 in coincidence with the second isthmus 92 and adjacent portions of the second peninsula 91 and edge region 84.

As seen in FIG. 31, the raised island 87 is spaced from both the first and second promontories 85 and 91, in addition to being spaced from the circumferential edge region 84 of the diaphragm.

As further seen in FIG. 31, first and second raised islands 87 and 94 may be provided at opposite side of, and spaced from, the first and second promontories 85 and 91. The islands 87 and 94 are also spaced from each other and integral with the diaphragm 81. A third stain gauge 74 is bonded to the diaphragm in coincidence with the first island 87 and a fourth strain gauge is bonded to the diaphragm in coincidence with the second island 94. The second island 94 also may have an isthmus 95 interconnecting two main portions of this second island, and the fourth strain gauge 74 may be bonded to the diaphragm in coincidence with such second insular isthmus 95.

The embodiment of FIGS. 31 and 32 ideally locates stress concentrations enabling all strain gauges 74 to be placed on the same side of the diphragm 81 and equalizing the compression and tension outputs to maintain a nearly stable impedance condition throughout the pressure/force range of the diaphragm or transducer. Such embodiment also provides for a displacement of the neutral stress plane (NP) away from the strain gauges 74 and from the central plane (CP) towards the lower surface of the diaphragm as seen in FIG. 32. The embodiment of FIGS. 31 and 32 thus provides for an amplification of tension (T) and compression (C) components as described above (see FIGS. 16d and 16e).

Figure 33:
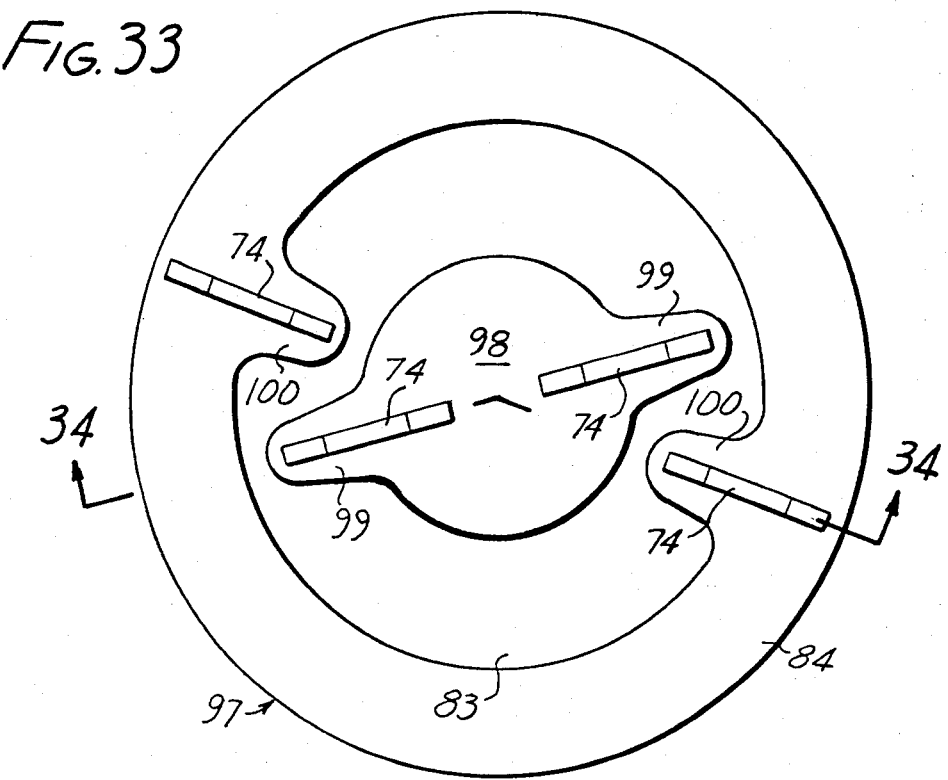
FIG. 33 is a top view of a diaphragm according to a further embodiment of my invention.
Figure 34:
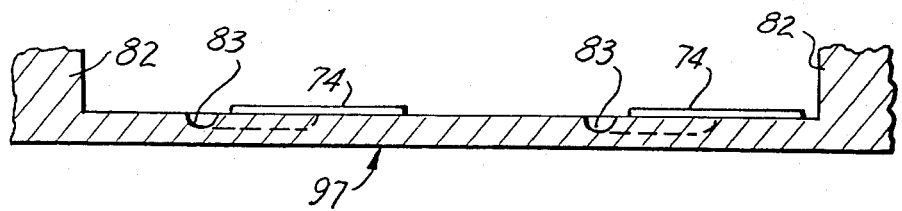
FIG. 34 is a section taken along line 34—34 in FIG. 33.

For similar features and advantages, reference may also be had to the embodiment of my invention illustrated in FIGS. 33 and 34.

In particular, the transducer diaphragm 97 shown in FIGS. 33 and 34 includes a central portion 98 having first radial projections 99, and a circumferential edge region 84 having second radial projections 100 and encompassing the central portion 98 and first radial projections 99. A recess 83 in the diaphragm 97 separates the central portion 98 and first radial projections 99 from the edge region 84 and second radial projections 100. Strain gauges 74 are bonded to the diaphragm 97 in coincidence with the projections 99 and 100.

The recess 83 extends perimetrically about the central portion 98 and first radial projections 99 and inside of the edge region 84 and second radial projections 100. The recess 83 may have a sinuous configuration as more clearly seen in FIGS. 35 and 36.

Figure 35:
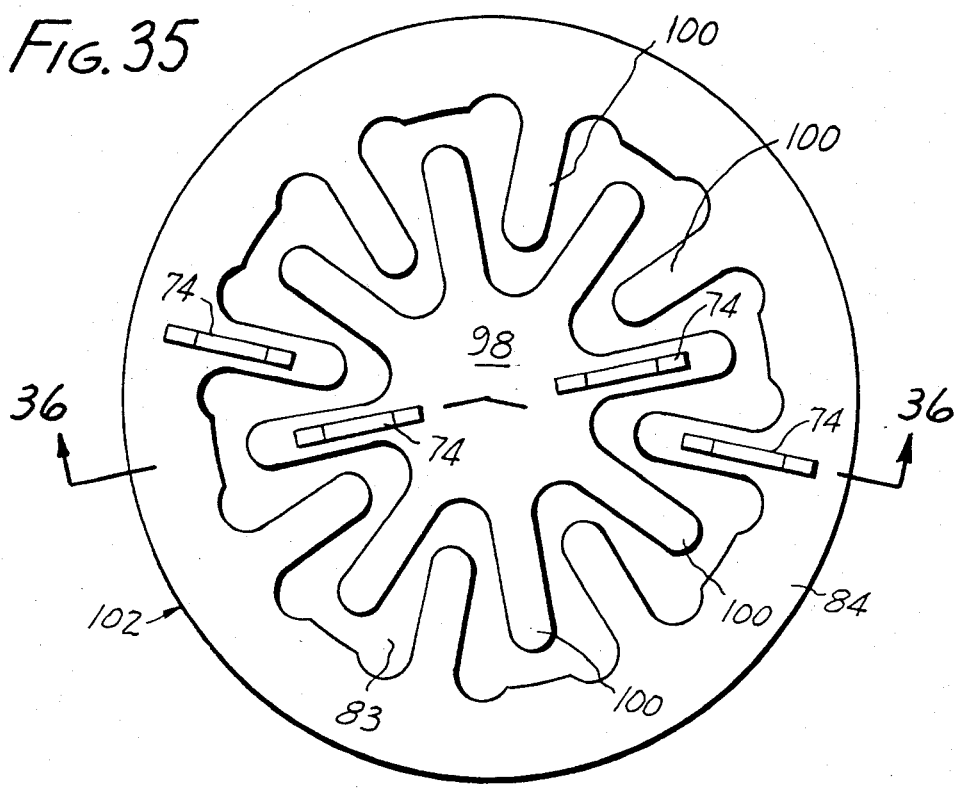
FIG. 35 is a top view of a diaphragm according to a further embodiment of my invention.
Figure 36:
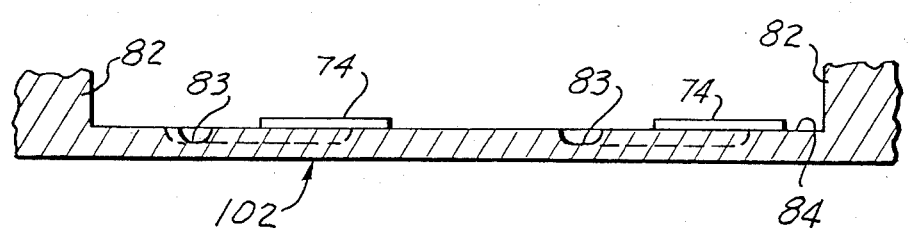
FIG. 36 is a section taken along line 36—36 in FIG. 35.

In particular, FIGS. 35 and 36 show a diaphragm 102 in accordance with a further embodiment of my subject invention, in which the first and second projections 99 and 100 of the central portion 98 and circumferential edge region 84, respectively, are interdigitated with each other which, incidentally, is also the case in the embodiment of FIGS. 33 and 34.

As seen in FIG. 35, the central portion 98 and first radial projections 100 form a star pattern in the recess 83. The second radial projections 100 are complementary with such star pattern. The recess 83 may be provided by etching material away from the diaphragm 102.

The further embodiments of my invention shown in FIGS. 37 to 40 provide diaphragms 104 and 105 having a circumferential edge region 84 and a raised central portion 106 spaced inwardly from the circumferential edge region and integral with the diaphragm. Diametrically opposed first and second isthmi 107 and 108 interconnect the edge region 84 with the inwardly spaced central portions or island 106. Diametrically opposed and mutually spaced third and fourth isthmi 109 and 110 are provided in the central portion 106 and are distinct from the first and second isthmi 103 and 108. First, second, third and fourth strain gauges 74 are bonded to the diaphragm in coincidence with the first, second, third and fourth isthmi 107, 108, 109 and 110, respectively. This in similarity to the embodiments of FIGS. 33 to 36 where strain gauges are individually bonded to or in concidence with projections 99 and 100.

Figure 37:
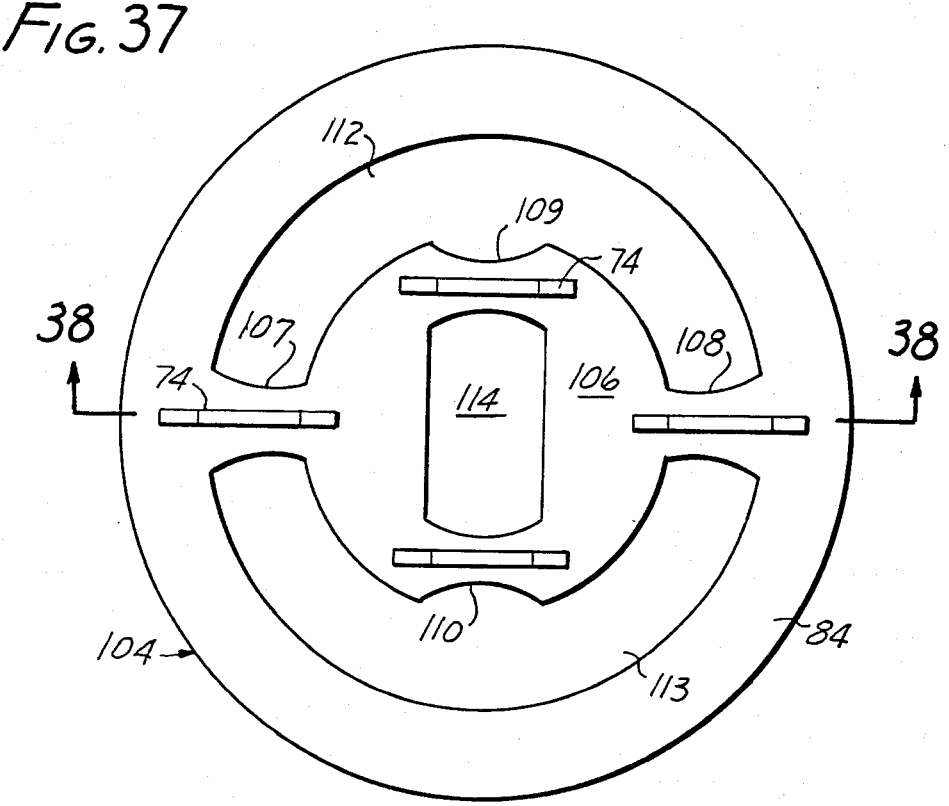
FIG. 37 is a top view of a diphragm according to a further embodiment of my invention.
Figure 38:
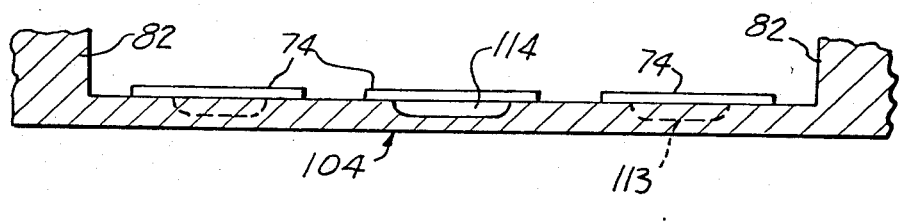
FIG. 38 is a section taken along the line 38—38 in FIG. 37.

As seen in FIG. 37, the first and second isthmi 107 and 108 extend along a diameter of the diaphragm 104. Conversely, the third and fourth isthmi 109 and 110 of the diaphragm 104 extend in parallel to the latter diameter.

The first and second isthmi 107 and 108 are formed with the aid of first and second recesses 112 and 113 provided in the diaphragm 104 or 105 between the edge region 84 and the central portion or peninsula 106. The third and fourth isthmi 109 and 110 in the diaphragm 104 are provided with the aid of a third recess 114 extending between the third and fourth isthmi 109 and 110 in the central portion 106 which is raised relative to the recesses 112 to 114. In the diaphragm 104, the third isthmus 109 is also bounded by the first recess 112, while the fourth isthmus 110 is also bounded by the second recess 113. In particular, the third recess 114 is extended between the first and second recesses 112 and 113 to provide the third isthmus 109 with the aid of the first recess 112 and to provide the fourth isthmus 110 with the aid of the second recess 113.

Figure 39:
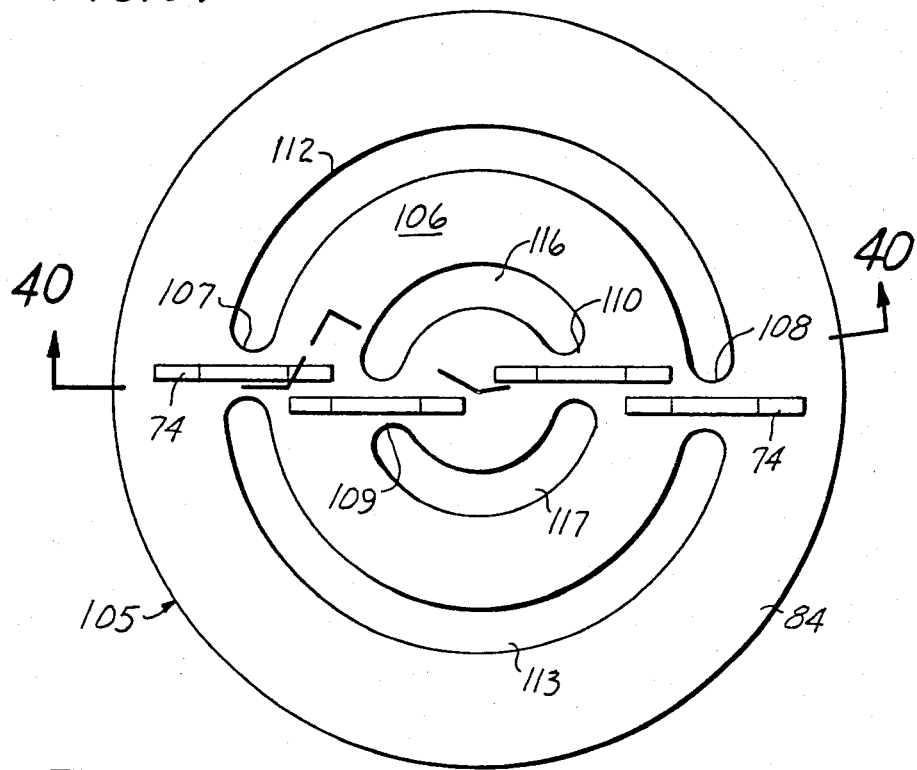
FIG. 39 is a top view of a diaphragm according to a further embodiment of my invention.
Figure 40:
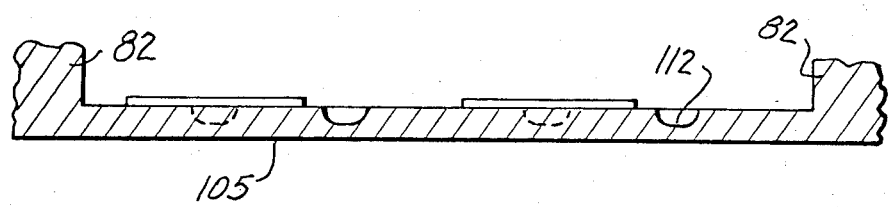
FIG. 40 is a section taken along the line 40—40 in FIG. 39.

Alternatively and as shown in FIGS. 39 and 40, the third and fourth isthmi 109 and 110 may be provided with the aid of, or may be bounded by, third and fourth recesses 116 and 117 provided in the central portion 106.

The embodiment of my invention shown in FIGS. 41 to 45 are related or bear a strong resemblance to the embodiment shown in FIGS. 15 to 16e having lacunose surface regions for shifting the neutral plane (NP) away from the central plane (CP) and away from the beam or diaphragm surface to which the strain gauges 74 are bonded.

In particular, the embodiments of FIGS. 15 and 41 to 45 provide a plurality of distinct recesses 64 in the beam or diaphragm and arrange such recesses 64 to provide in the beam or diaphragm distinct first, second, third and fourth isthmi 123, 124, 125 and 126 between adjacent pairs of recesses 64. Distinct first, second, third and fourth strain gauges 74 are bonded, respectively, to the first, second, third and fourth isthmi 123, 124, 125 and 126.

Figure 41:
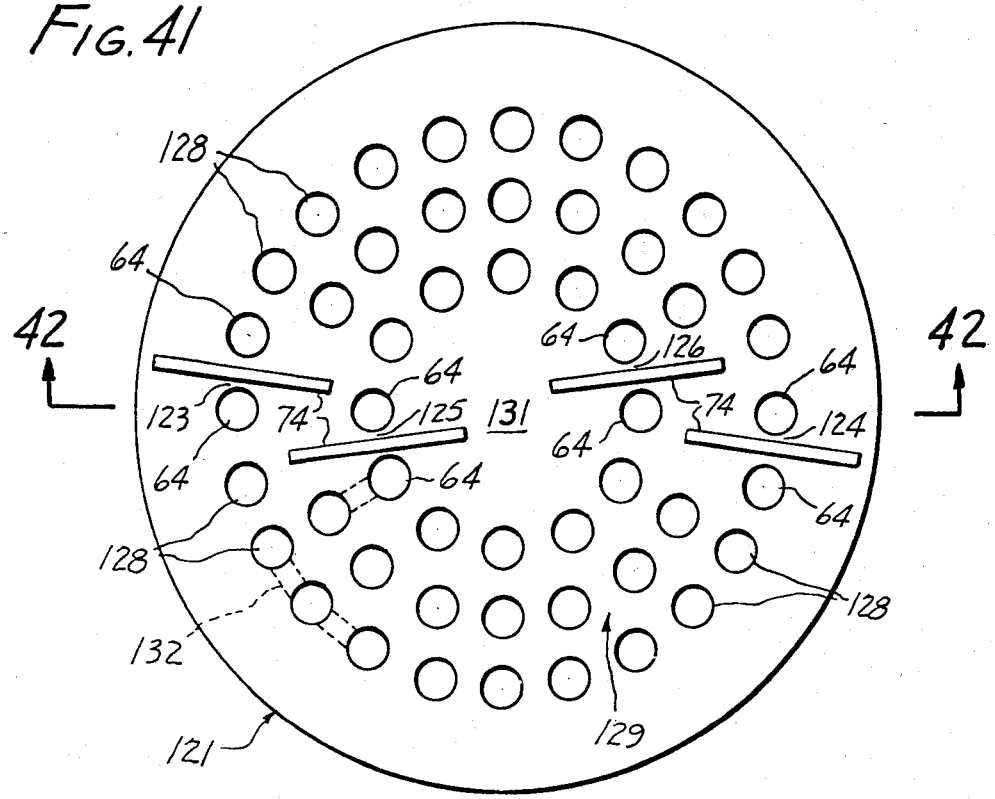
FIG. 41 is a top view of a diaphragm according to a further embodiment of my invention.
Figure 42:
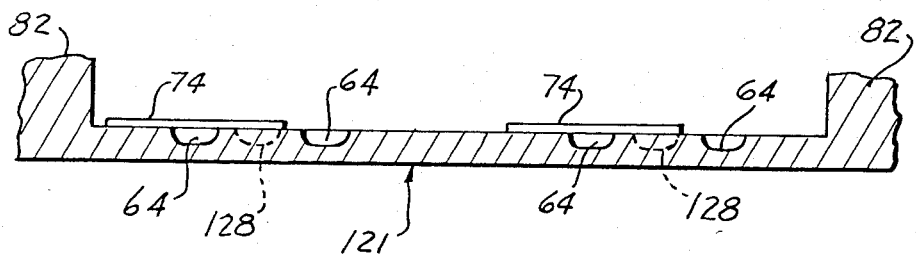
FIG. 42 is a section taken along the line 42—42 in FIG. 41.

As seen in FIGS. 41 and 42, further recesses 128 may be provided in the diaphragm 120 in addition to the recesses 64 providing the first, second, third and fourth isthmi 123 to 126. In particular, as in the case of the embodiment shown in FIGS. 15 to 16e, as many further recesses 128 may be provided as required to form a lacunose beam or diaphragm region displacing the neutral plane (NP) relative to the central plane (CP). According to the embodiment shown in FIGS. 41 and 42, the further recesses 128 and the recesses 64 providing the isthmi 123 to 126 are located in an annular region 129 encompassing a central region 130 on the diaphragm 121. As indicated in FIG. 41 by dotted lines at 132, at least some of the further recesses 128 may be interconnected by yet further recesses or interconnecting grooves in the diaphragm 121.

Figure 43:
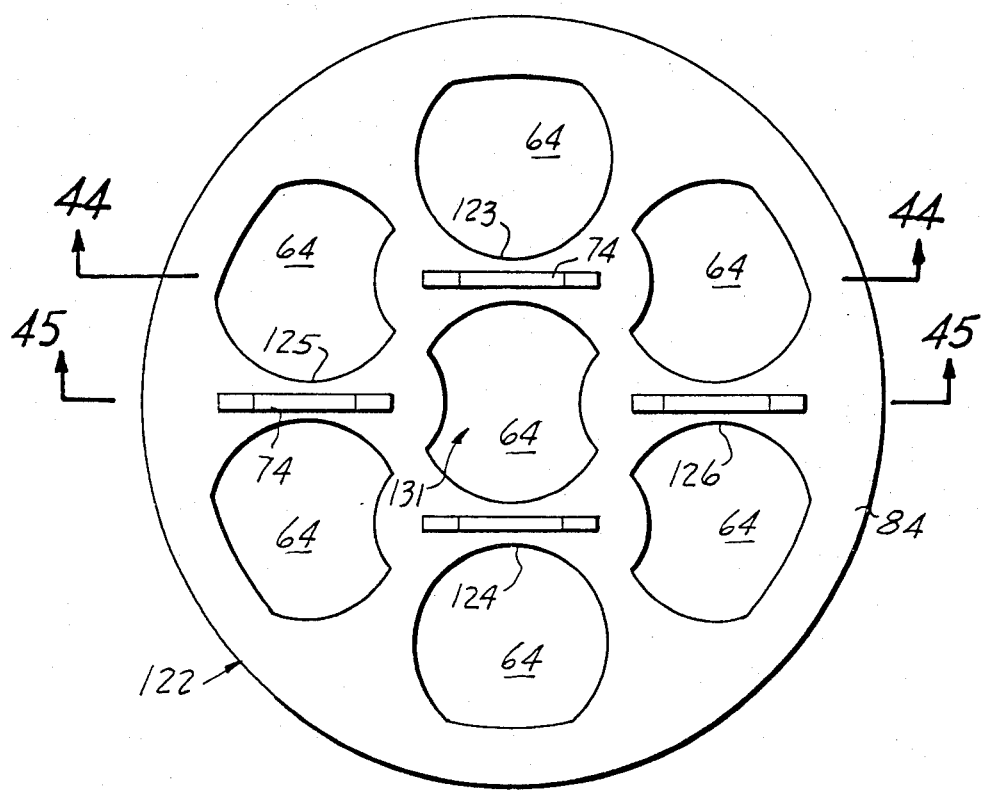
FIG. 43 is a top view of a diaphragm according to a further embodiment of my invention.
Figure 44:
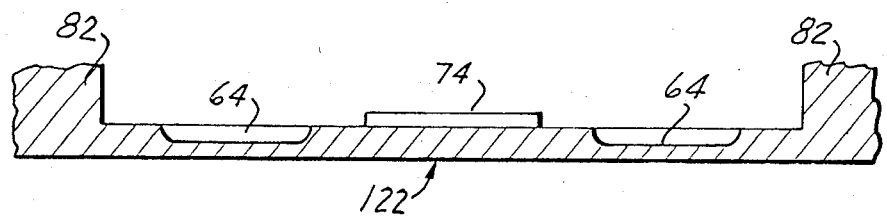
FIG. 44 is a section taken along the line 44—44 in FIG. 43.
Figure 45:
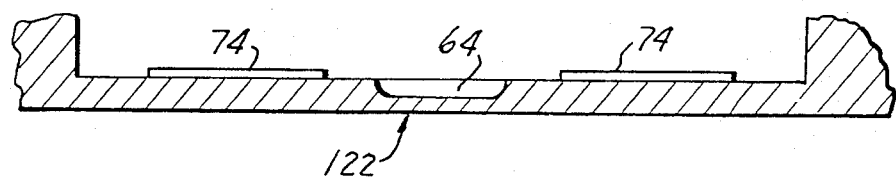
FIG. 45 is a section taken along the line 45—45 in FIG. 43.

According to the embodiment shown in FIGS. 43 to 45, one of the distinct recesses 64 is a central recess in a central region 131 of the diaphragm. The other of the distinct recesses 64 are situated around the central recess in a planetary manner between such central recess or central region 131 and a circumferential edge region 84 of the diaphragm.

The first isthmus 123 may then be located between the central recess and a first one of the other recesses, and the second isthmus 124 may be located between the central recess and a second one of the other recesses. The third isthmus 125 may be located between a third and fourth of the other recesses, and the fourth isthmus 126 between a fifth and sixth of the other recesses 64. Two of the isthmi preferably are located, respectively, between two different pairs of the other recesses 64, as seen, for instance, at the right and left-hand sides of FIG. 43.

As already indicated, the apertures 64 in FIGS. 41 to 45 and the apertures 128 in FIGS. 41 and 42 may be viewed as providing a lacunose surface region on the diaphragm 121 or 122, with strain gauges bonded to the diaphragm in coincidence with regions located between lacunae on the lacunose surface region. In particular, isthmi 123 to 126 are formed between lacunae of the lacunose surface region, and strain gauges are bonded to the diaphragm 121 or 122 in coincidence with such isthmi. Recesses 132 as indicated in FIG. 41 may be provided to interconnect lacunae of the lacunose surface region. Such lacunae 64 and 128, and any recesses 132, preferably are provided by selectively etching material from the diaphragm. Reverting now to the preferred embodiment of my invention shown in FIGS. 21 to 24, the diaphragm 71 has a circumferential edge region 84 and a raised central portion 78 spaced inwardly from the circumferential edge region and integral with the diaphragm 71.

A first peninsula 131 extends from the edge region 84 towards, but is spaced from, the central portion 78 and is connected to the edge region 84 by a first isthmus 123. A second peninsula 132 extends from the edge region 84 towards, but is spaced from, the central portion 78 opposite the first peninsula 131, and is connected to the edge region 84 by a second isthmus 124. A third peninsula 133 extends from the central portion 78 towards, but is spaced from, the edge region 84 and is connected to the central portion 78 by a third isthmus 125. A fourth peninsula 134 extends from the central portion 78 towards, but is spaced from, the edge region 84 opposite the third peninsula 133, and is connected to the central portion 78 by a fourth isthmus 126. First, second, third and fourth strain gauges 74 are bonded to the diaphragm 71 along the first, second, third and fourth isthmi 123, 124, 125 and 126, respectively.

The first and third peninsulas 131 and 133 are preferably arranged in a first pair 136 of adjacent but distinct peninsulas. Similarly, the second and fourth peninsulas 132 and 134 are preferably arranged in a second pair 134 of adjacent but distinct peninsulas. Further isthmi may be provided between the central portion 78 and edge region 84. In particular, fifth and sixth isthmi 141 and 142 may extend from the edge region 84 to the central portion 78 along opposite side of the first pair 136. Similarly, seventh and eighth isthmi 143 and 144 may extend from the edge region 84 to the central portion 78 along opposite sides of the second pair 137. In practice, the additional isthmi 141 to 144 serve to isolate the strain gauges 74 from externally induced stresses, such as hoop stresses due to lateral depression of the diaphragm, and stresses induced in the mounting process by the tightening of fasteners and otherwise.

A first curved recess 146 may be located in the diaphragm 71 between the edge region 84 and the central portion 78 and may extend from the fifth isthmus 141 to the seventh isthmus 143. Similarly, a second curved recess 148 may be located in the diaphragm 71 between the edge region 84 and the central portion 78 and may extend opposite the first curved recess 148 from the sixth isthmus 142 to the eighth isthmus 144.

FIG. 23 shows a fraction of the diaphragm 71 shown more fully in FIGS. 21 and 22, or may be viewed as an application of the teachings of the embodiment of FIGS. 21 and 22 to a beam or other stress distribution plate 149.

Figure 24:
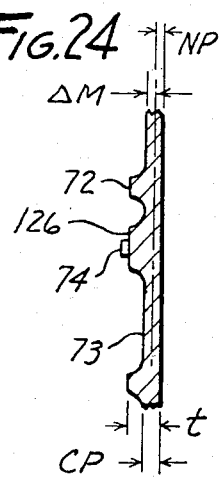
FIG. 24 is a sectional view taken along line 24—24 of FIG. 23.

As seen, for instance, in FIG. 24, the neutral stress plane (NP) is displaced away from the central plane (CP) and from the strain gauges 74 to provide a considerable mechanical advantage (MA) or amplification of tension (T) and compression (C) components. To calculate the approximate mechanical advantage (MA) or amplification of a particular design, the distance ($\Delta M$) between the center plane (CP) and the neutral plane (NP) must be determined. This can be done by sectioning the beam or diaphragm normal to the center plane (CP) and the strain gauge at the point of maximum compression (C) or tension (T), or apex, and dividing the cross sectional area so that the two divided areas are equal on both sides of this line or plane. This is the neutral plane (NP) and is parallel to the central plane (CP) and the distance between the two planes is the distance $\Delta M$.

The section of a beam is defined by its outline. However, in the case of a diaphragm, the section must be limited to a distance approximately equal to the active length of the strain gauge on both sides of the strain gauge, for the purposes of the subject calculation. Referring to the beam or diaphragm section shown in FIG. 24, we may designate the maximum diaphragm thickness by the letter t. In a prototype of the diaphragm shown in FIGS. 21 to 24, the maximum diaphragm thickness, t, was 0.152 mm and the effective length of a strain gauge 74 was 1.824 mm. The distance of the central plane (CP) from the right-hand side of the section shown in FIG. 24 was equal to t/2 or 0.076 mm.

The effective area of the beam or diaphragm to the left of the central plane (CP) as seen in FIG. 24 was 0.039 mm². On the other hand, the area to the right of the central plane (CP) as seen in FIG. 24 was 0.138 mm², providing for a total sectional area of 0.177 mm² and a value of 0.088 mm² for half that area.

To calculate the distance, $\Delta M$, between the central plane (CP) and the neutral plane (NP) we may use the following equation:

$$\Delta M = t/2 - \frac{A/2}{l} \tag{2}$$

wherein
t = maximum diaphragm thickness,
A = total effective section area, and
l = active length as defined above.

Applying the above mentioned appropriate millimeter (mm) values to equation (2), we obtain a $\Delta M$ of 0.028 mm or 0.19t.

For the mechanical amplification, MA, we may basically write:

$$MA = \epsilon_2/\epsilon_1 \tag{3}$$

wherein:
$\epsilon_1$ = strain of conventional diaphragm/beam, and
$\epsilon_2$ = amplified strain.

In order to enable a comparison between a conventional, uniform thickness diaphragm and the lacunose or mesa/recess diaphragms according to the subject invention, we may write:

$$MA = \frac{t_2}{t_1} + \frac{2\Delta M}{t_1} \tag{4}$$

wherein:
$t_1$ = thickness of uniform-thickness diaphragm, and
$t_2$ = maximum thickness (previously t) of diaphragm according to invention.

Employing the value set forth above for t for the case of equal diaphragm thicknesses ($t_1 = t_2$) and using the above mentioned calculated value for $\Delta M$, we obtain pursuant to equation (4) a calculated value for the mechanical advantage or amplification (MA) of 1.368.

The mechanical amplification is even more substantial if the total thickness of a diaphragm according to the subject invention has been substantially increased over the thickness of a uniform-thickness priorart diaphragm. For instance, if we assume that the above value of t of 0.152 mm represents twice the thickness of a given uniform-thickness diaphragm, we may find with the aid of equation (4) that the mechanical advantage (MA) or amplification is equal to 2.736. In practice, amplifications by a factor of more than three are readily attainable.

In addition to this amplification, I thus obtain the advantages of an increased overall diaphragm thickness in terms of increased stability and low drift. At the same time, the mass of my diaphragm relative to its overall thickness is kept low by the disclosed recesses, whereby a favorable frequency response is achieved.

Similarly, advantageous considerations apply to my other embodiments, including the embodiments shown in FIGS. 25 to 29.

In particular, distinct first, second, third and fourth isthmi 123, 124, 125 and 126 are provided in the beam or diaphragm, each having a longitudinal dimension. As shown in FIG. 25, the first, second, third and fourth isthmi 123 to 126 are arranged to extend along their longitudinal dimensions in series between opposite marginal diaphragm or beam regions 151 and 152. First, second, third and fourth strain gages 74 are bonded, respectively, to the first, second, third and fourth isthmi 123, 124, 125 and 126, as seen in FIG. 25.

Figure 28:
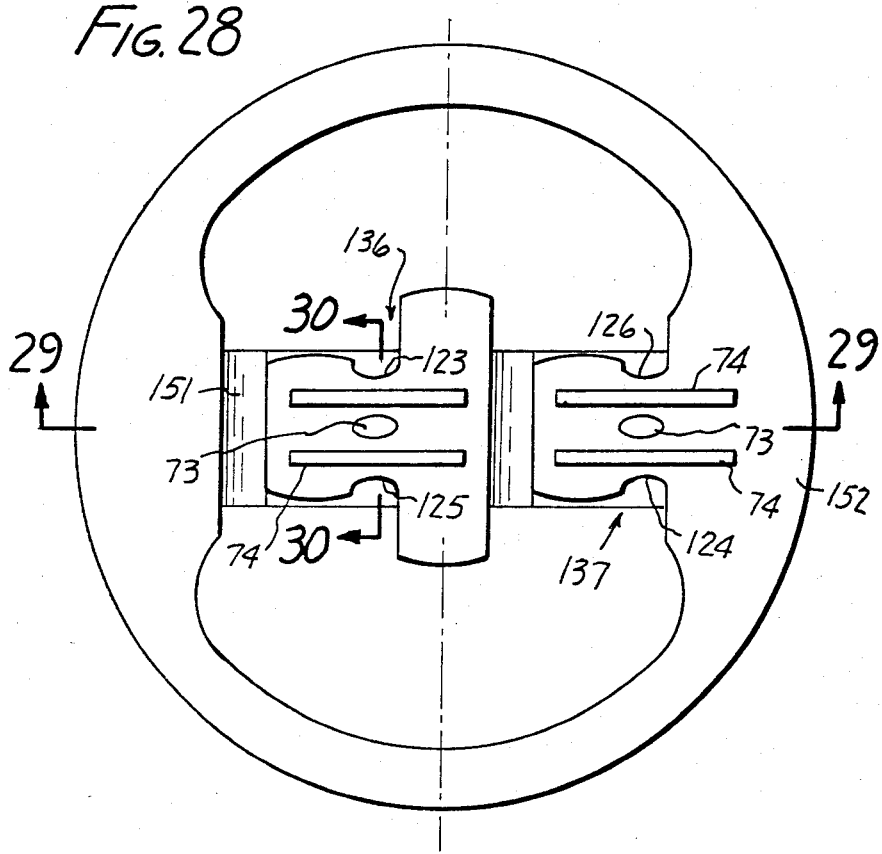
FIG. 28 is a top plan view of yet another preferred embodiment of my invention.
Figure 30:
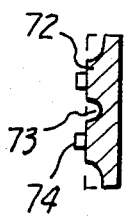
FIG. 30 is a sectional view taken along line 30—30 of FIG. 28.

According to the embodiment shown in FIGS. 28 and 29, a first pair 136 of isthmi 123 and 125, having longitudinal dimensions, is provided in the beam or diaphragm. Similarly, a second pair 137 of isthmi 124 and 126, having longitudinal dimensions, is also provided in the beam or diaphragm. The first and second pair of isthmi 136 and 137 are arranged to extend with their longitudinal dimensions in series between opposite marginal diaphragm or beam regions 151 and 152.

First, second, third and fourth strain gauges 74 are bonded, respectively, to the first, second, third and fourth isthmi 123 to 126. As seen in FIG. 28, the longitudinal dimensions of the isthmi 123 and 125 in the first pair 136 may be arranged in parallel, while the longitudinal dimensions of the isthmi 124 and 126 in the second pair 137 may also be arranged to extend in parallel with each other and, if desired, in parallel with the longitudinal dimensions of the isthmi in the first pair 136.

The stress distribution plates, beams or diaphragms according to my invention have a wide range of utility, including the transducer field, in a wide range of loads, including high, medium and low pressure applications. As an important feature, the principles of my invention enable work at extremely low pressures, such as pressures below one-half pound per square inch (psi) and even as low as one-tenth psi and less.

The latter aspect of my invention will now be explained with the aid of the right-hand side of FIGS. 21 and 22. By way of background, the patterns of mesas and recesses 72 and 73 or peninsulas and isthmi may, and preferably should, be symmetrical relative to, or identical on both sides of, a central axis which, for instance, may be a central axis of a diaphragm or stress distribution plate, or a longitudinal or transverse axis of a beam, depending on configuration and application. Accordingly, the patterns of mesas and recesses or peninsulas and isthmi typically would be the same on both right and left hand sides of FIGS. 21 and 22; that is, either the same as shown for the left-hand side or the same as shown and presently to be discussed for the right-hand side of FIGS. 21 and 22.

In this respect, the presently discussed right-hand side of the illustrated stress distribution plate or beam also has its neutral stress plane (NP) displaced from the central plane (CP), as previously disclosed with respect to FIG. 24, for instance.

In addition to mesas and recesses on the first surface 63, the predetermined pattern shown in the right-hand side of FIGS. 21 and 22 includes apertures 156 penetrating the plate or diaphragm 71 through the first and second surfaces 63 and 65 or, in other words, through its entire thickness. The apertures 156 in particular penetrate the plate or diaphragm adjacent the mesas and recesses in the first surface 63. This feature may also be applied to the recesses 146 and 148 which, accordingly, may be partially or fully replaced by through holes or apertures 157 and 158 penetrating the thickness of the plate or diaphragm 71 through the first and second surfaces 63 and 65.

Because of the presence of the penetrating apertures 156, the recesses 73 may be reduced to narrower recesses 173 defining the isthmi 124 and 126 of the peninsulas 132 and 134. By way of example, if the plate or diaphragm structure is provided by etching, then the plate or diaphragm would be etched through its thickness at the apertures 156 to 158, but would be etched for only a certain portion of its thickness from the first surface 63 for a provision of the recesses 173, as best seen in FIG. 22. In practice, the apertures 156 and 158 could be provided by simultaneous etching from both surfaces.

In accordance with a preferred embodiment of my invention, one or more grooves or recesses 161 may be provided in the second surface 65, so as to interconnect the apertures 156.

In particular, the stress distribution plate or diaphragm 71 may comprise an edge region 84 and a raised portion 78 spaced from the edge region and integral with the plate 71. A first peninsula 132 extends from the edge region 84 to the spaced portion 78 and is connected to the edge region 84 by a first isthmus 124. A second peninsula 134 extends from the spaced portion 78 to the edge region 84 and is connected to the spaced portion 78 by a second isthmus 126. Mutually spaced apertures 156 penetrate the plate 71 adjacent the peninsulas 132 and 134 and isthmi 124 and 126. A third isthmus interconnects the first peninsula 132 with the spaced portion 78, while a fourth isthmus interconnects the second peninsula 134 with the edge region 84. These third and fourth isthmi are formed by or extend adjacent the grooves or recesses 161. The previously mentioned lateral isthmi 143 and 144 may be omitted for extreme sensitivity or may be retained for high stability. In the latter case, the previously mentioned apertures 157 and 158 may be provided between and through the first and second plate surfaces 63 and 65.

When pressure is applied to the plate or diaphragm 75, the third and fourth isthmi provide fulcrums adjacent the grooves or recesses 161, as shown at 162 in FIG. 2. Such fulcrum mounts offer a minimum of resistance to movement of the central region of the plate or diaphragm in response to pressure.

A very high-sensitivity response of the strain gauges 74 is thus accomplished. At the same time, the substantial mechanical advantage or amplification previously described is preserved.

Ideally this reduces the need for the type of electronic amplification which, prior to the subject invention, would amplify not only the desired transducer output signal, but also noise and manifestations of non-linearlity.

In cases where pressure is picked up directly, a pressure sensing element, such as a diaphragm of the type shown at 76 in FIGS. 26 and 29, may be employed, in which case the plate 71 is a diaphragm in a figurative sense. For example, the diaphragm 76 and force transfer rod 77 shown in FIGS. 26 and 29 may be employed for picking up pressure and transferring such picked-up pressure force to the central portion 78 of the stress distribution plate 71 shown in FIGS. 21 and 22.

The subject invention and embodiments thereof meet the initially mentioned objectives in an advantageous and relatively low-cost manner.

The subject extensive disclosure renders apparent or suggests various modifications and variations within the spirit and scope of the invention to those skilled in the art.

I claim:

1. In a method of manufacturing a stress distribution plate for a pressure transducer having a central plane and a neutral stress plane, the improvement comprising: displacing the neutral stress plane from the central plane.

2. A method as claimed in claim 1, wherein: said plate is provided with a first surface and a second surface at opposite sides of said central plane, and with a predetermined pattern of mesas and recesses on the first surface displacing the neutral stress plane from said central plane.

3. A method as claimed in claim 2, wherein: said mesas are provided with surface areas located on the first surface to produce maximum areas of tension and compression in predetermined areas of the first surface when the plate is under stress.

4. A method as claimed in claim 2, wherein: said predetermined pattern is provided symmetrically to a central axis of the plate.

5. A method as claimed in claim 4, wherein: said predetermined pattern is provided with recesses displaced from a central area of the plate.

6. A method as claimed in claim 5, wherein: said displaced recesses are provided symmetrically about an axis normal to the central axis.

7. A method as claimed in claim 2, wherein: said predetermined pattern is provided with corresponding recesses and mesas on both sides of a central axis of the plate.

8. A method as claimed in claim 2, wherein: said predetermined pattern is provided with identical recesses and mesas on both sides of a central axis of the plate.

9. A method as claimed in claim 2, wherein: said predetermined pattern of mesas and recesses is formed by a chemical etching process.

10. In a method of making a stress distribution plate for use in a pressure transducer, the improvement comprising in combination the steps of:
forming a plate with an upper surface and with a lower surface extending parallel to the upper surface;
providing a neutral pressure plane coincident with the central plane; and
concentrating the stress experienced by the plate to predetermined areas when the plate is flexed, by removing predetermined portions from the plate at the upper surface until the neutral plane is displaced from the central plane.

11. A method as claimed in claim 10, including the step of:
mounting a strain gauge on said upper surface.

12. A method as claimed in claim 10 or 11, wherein: the neutral stress plane is located between the central plane and the lower surface.

13. A method as claimed in claim 10 or 11, wherein: said predetermined portions are removed by chemically etching such predetermined portions away from the plate at the upper surface.

14. In a method of making a transducer diaphragm, the improvement comprising in combination the steps of:
providing a recess in said diaphragm encompassed by a circumferential edge region of said diaphragm;
providing a promontory projecting from said edge region into said recess and being integral with said diaphragm; and
bonding a strain gauge to said diaphragm in coincidence with said promontory.

15. A method as claimed in claim 14, including the step of:
extending said strain gauge from coincidence with said promontory into coincidence with part of said edge region adjacent said promontory.

16. A method as claimed in claim 14, including the steps of:
providing said promontory as a peninsula located in said recess and connected to said edge region by an isthmus; and
bonding said strain gauge to said diaphragm in coincidence with said isthmus and with adjacent portions of said peninsula and of said edge region.

17. A method as claimed in claim 14, 15 or 16, including the steps of:
providing in said recess a raised island spaced from said promontory and from said edge region and integral with said diaphragm; and
bonding a further strain gauge to said diaphragm in coincidence with said island.

18. A method as claimed in claim 17, including the steps of:
 providing said spaced island with an isthmus interconnecting two main portions of said island; and
 bonding said further strain gauge to said diaphragm in coincidence with said isthmus of said spaced island.

19. In a method of making a transducer diaphragm, the improvement comprising in combination the steps of:
 providing a recess in said diaphragm encompassed by a circumferential edge region of said diaphragm;
 providing a first promontory projecting from said edge region into said recess and being integral with said diaphragm;
 providing a second promontory separate from said first promontory and projecting from said edge region into said recess diametrically opposite from said first promontory and being integral with said diaphragm;
 bonding a first strain gauge to said diaphragm in coincidence with said first promontory; and
 bonding a second strain gauge to said diaphragm in coincidence with said second promontory.

20. A method as claimed in claim 19, including the steps of:
 extending said first strain gauge from coincidence with said first promontory into coincidence with a first part of said edge region adjacent said first promontory; and
 extending said second strain gauge from coincidence with said second promontory into coincidence with a second part of said edge region adjacent said second promontory.

21. A method as claimed in claim 19, including the steps of:
 providing said first promontory as a first peninsula located in said recess and connected to said edge region by a first isthmus;
 providing said second promontory as a second peninsula located in said recess, spaced from said first peninsula, and connected to said edge region by a second isthmus;
 bonding said first strain gauge to said diaphragm in coincidence with said first isthmus and adjacent portions of said first peninsula and said edge region; and
 bonding said second strain gauge to said diaphragm in coincidence with said second isthmus and adjacent portions of said second peninsula and said edge region.

22. A method as claimed in claim 19, 20 or 21, including the steps of:
 providing in said recess a raised island spaced from said first and second promontories and from said edge region and integral with said diaphragm; and
 bonding a third strain gauge to said diaphragm in coincidence with said island.

23. A method as claimed in claim 22, including the steps of:
 providing said spaced island with an isthmus interconnecting two main portions of said island; and
 bonding said third strain gauge to said diaphragm in coincidence with said isthmus of said spaced island.

24. A method as claimed in claim 19, 20 or 21, including the steps of:
 provding in said recess first and second raised islands at opposite sides of, and spaced from, said first and second promontories and from each other, and integral with said diaphragm;
 bonding a third strain gauge to said diaphragm in coincidence with said first island; and
 bonding a fourth strain gauge to said diaphragm in coincidence with said second island.

25. A method as claimed in claim 24, including the steps of:
 providing said first island with a first insular isthmus interconnecting two main portions of said first island;
 providing said second island with a second insular isthmus interconnecting two main portions of said second island;
 bonding said third strain gauge to said diaphragm in coincidence with said first insular isthmus; and
 bonding said fourth strain gauge to said diaphragm in coincidence with said second insular isthmus.

26. In a method of making a transducer diaphragm, the improvement comprising in combination the steps of:
 providing said diaphragm with a central portion having first radial projections and a circumferential edge region having second radial projections and encompassing said central portion and first radial projections, said central portion and first radial projections being separated from said edge region and second radial projections by a recess provided in said diaphragm; and
 bonding strain gauges to said diaphragm in coincidence with said projections.

27. A method as claimed in claim 26, wherein:
 said recess is perimetrically provided about said central portion and first radial projections and inside of said edge region and second radial projections.

28. A method as claimed in claim 26, wherein:
 said recess is provided as a sinuous recess.

29. A method as claimed in claim 26, wherein:
 said first and second projections are interdigitated with each other.

30. A method as claimed in claim 26, wherein:
 said central portion and first radial projections form a star pattern in said recess.

31. A method as claimed in claim 30, wherein:
 said second radial projections are complementary with said star pattern.

32. A method as claimed in claim 26, 27, 28, 29, 30 or 31, wherein:
 said recess is provided by etching material away from said diaphragm.

33. In a method of making a transducer diaphragm, the improvement comprising in combination the steps of:
 providing said diaphragm with a circumferential edge region and a raised central portion spaced inwardly from said circumferential edge region and integral with said diaphragm;
 providing diametrically opposed first and second isthmi interconnecting said edge region with said inwardly spaced central portion;
 providing said central portion with diametrically opposed and mutually spaced third and fourth isthmi distinct from said first and second isthmi; and
 bonding first, second, third and fourth strain gauges to said diaphragm in coincidence with said first, second, third and fourth isthmi, respectively.

34. A method as claimed in claim 33, wherein:

said first and second isthmi are extended along a diameter of said diaphragm.

35. A method as claimed in claim 34, wherein:
said third and fourth isthmi are extended in parallel to said diameter.

36. A method as claimed in claim 33, 34 or 35, wherein:
said first and second isthmi are provided with the aid of first and second recesses provided in said diaphragm between said edge region and said central portion; and
said third and fourth isthmi are provided with the aid of a third recess provided in said raised central portion between said third and fourth isthmi.

37. A method as claimed in claim 36, wherein:
said third recess is extended between said first and second recesses to provide the third isthmus with the aid of said first recess and to provide the fourth isthmus with the aid of said second recess.

38. A method as claimed in claim 33, 34 or 35, wherein:
said first and second isthmi are provided with the aid of first and second recesses provided in said diaphragm between said edge region and said central portion; and
said third and fourth isthmi are provided with the aid of third and fourth recesses provided in said raised central portion.

39. In a method of making a transducer diaphragm, the improvement comprising in combination the steps of:
providing said diaphragm with a circumferential edge region and a raised central portion spaced inwardly from said circumferential edge region and integral with said diaphragm;
providing said edge region with a first peninsula extending towards, but being spaced from, said central portion and being connected to said edge region by a first isthmus;
providing said edge region with a second peninsula extending towards, but being spaced from, said central portion opposite said first peninsula, and being connected to said edge region by a second isthmus;
providing said central portion with a third peninsula extending towards, but being spaced fron, said edge region and being connected to said central portion by a third isthmus;
providing said central portion with a fourth peninsula extending towards, but being spaced from, said edge region opposite said third peninsula, and being connected to said central portion by a fourth isthmus; and
bonding first, second, third and fourth strain gauges to said diaphragm along said first, second, third and fourth isthmi, respectively.

40. A method as claimed in claim 39, including the step of:
providing further isthmi between said central portion and edge region.

41. A method as claimed in claim 39, including the steps of:
arranging said first and third peninsulas in a first pair of adjacent but distinct peninsulas; and
arranging said second and fourth peninsulas in a second pair of adjacent but distinct peninsulas.

42. A method as claimed in claim 41, including the steps of:
providing fifth and sixth isthmi extending from said edge region to said central portion along opposite sides of said first pair; and
providing seventh and eighth isthmi extending from said edge region to said central portion along opposite sides of said second pair.

43. A method as claimed in claim 42, including the steps of:
providing in said diaphragm between said edge region and said central portion a first curved recess extending from the fifth isthmus to the seventh isthmus; and
providing in said diaphragm between said edge region and said central portion a second curved recess extending opposite said first curved recess from the sixth isthmus to the eighth isthmus.

44. In a method of making a transducer diaphragm, the improvement comprising in combination the steps of:
providing in said diaphragm distinct first, second, third, and fourth isthmi each having a longitudinal dimension;
arranging said first, second, third and fourth isthmi to extend along their longitudinal dimensions in series between opposite marginal diaphragm regions; and
bonding first, second, third and fourth strain gauges, respectively, to said first, second, third and fourth isthmi.

45. A method as claimed in claim 44, including the step of:
arranging said isthmi with their longitudinal dimensions in parallel to a diaphragm diameter extending between said opposite marginal diaphragm regions.

46. In a method of making a transducer diaphragm, the improvement comprising in combination the steps of:
providing in said diaphragm a first pair of isthmi having longitudinal dimensions;
providing in said diaphragm a second pair of isthmi having longitudinal dimensions;
arranging said first and second pairs of isthmi to extend with their longitudinal dimensions in series between opposite marginal diaphragm regions; and
bonding first, second, third and fourth strain gauges, respectively, to said first, second, third and fourth isthmi.

47. A method as claimed in claim 46, including the step of:
arranging in parallel the longitudinal dimensions of the isthmi in said first pair; and
arranging in parallel the longitudinal dimensions of the isthmi in said second pair.

48. In a method of making a transducer diaphragm, the improvement comprising in combination the steps of:
providing a plurality of distinct recesses in said diaphragm;
arranging said recesses to provide in said diaphragm distinct first, second, third and fourth isthmi between adjacent pairs of said recesses; and
bonding distinct first, second, third and fourth strain gauges, respectively, to said first, second, third and fourth isthmi.

49. A method as claimed in claim 48, including the step of:
providing further recesses in said diaphragm in addition to said recesses providing said first, second, third and fourth isthmi.

50. A method as claimed in claim 49, including the step of:
providing said further recesses and said recesses providing said isthmi in an annular region encompassing a central region on said diaphragm.

51. A method as claimed in claim 49, including the step of:
interconnecting at least some of said further recesses by yet further recesses.

52. A method as claimed in claim 48, wherein:
one of said distinct recesses is provided as a central recess in a central region of said diaphragm; and
the other of said distinct recesses are provided in a planetary manner between said central recess and a circumferential edge region of said diaphragm.

53. A method as claimed in claim 52, wherein:
said first isthmus is provided between said central recess and a first of said other recesses; and
said second isthmus is provided between said central recess and a second of said other recesses.

54. A method as claimed in claim 53, wherein:
said third isthmus is provided between a third and a fourth of said other recesses; and
said fourth isthmus is provided between a fifth and a sixth of said other recesses.

55. A method as claimed in claim 52, wherein:
two of said isthmi are provided, respectively, between two different pairs of said other recesses.

56. In a method of making a transducer diaphragm, the improvement comprising in combination the steps of:
providing said diaphragm with a lacunose surface region; and
bonding strain gauges to said diaphragm in coincidence with regions located between lacunae of said lacunose surface region.

57. A method as claimed in claim 56, including the steps of:
forming isthmi between lacunae of said lacunose surface region; and
bonding strain gauges to said diaphragm in coincidence with said isthmi.

58. A method as claimed in claim 56, including the step of:
providing recesses in said surface region interconnecting lacunae of said lacunose surface region.

59. A method as claimed in claim 56, 57 or 58, wherein:
the lacunae in said lacunose surface region, and any recesses, are provided by selectively etching material from said diaphragm.

60. A method of making a transducer diaphragm employing a chemical etching process in combination with a masking technique to control the thickness and the diameter of the active area of the diaphragm, which diaphragm is designed for carrying strain gauges bonded on one face of the diaphragm within the inside edge of an annular support wall, wherein the improvement comprises:
an etching process including the step of etching one face of the diaphragm to chemically mill out a central recess which forms the active portion of the diaphragm as defined by an outer boundary and having a uniform thickness within the boundary with the diameter of the central recess appreciably less than the inner diameter of the annular support wall to displace the active portion of the diaphragm inwardly from the inside edge of the annular support wall, and to chemically mill a peripheral notch extending from the central recess into the nonactive portion of the diaphragm for receiving a compression-sensitive strain gauge.

61. A method as claimed in claim 60, wherein:
said etching step includes chemically milling a central recess having a diameter which is essentially 75-80% of the inner diameter of the annular support wall.

62. A method as claimed in claim 60, wherein:
said etching step includes chemically milling a pair of peripheral notches displaced 180° apart.

63. A method as claimed in claim 60, wherein:
said etching step includes milling the central recess on one face of the diaphragm and simultaneously milling the marginal edges of the diaphragm on opposite faces of the diaphragm to achieve a uniform thickness for the central recess which is essentially one-half the thickness of the non-active portion of the diaphragm.

* * * * *